US006493936B2

(12) United States Patent
Doi et al.

(10) Patent No.: US 6,493,936 B2
(45) Date of Patent: Dec. 17, 2002

(54) METHOD OF MAKING STEAM TURBINE BLADE

(75) Inventors: Hiroyuki Doi; Mitsuo Kuriyama, both of Ibaraki-ken; Shigeyoshi Nakamura, Hitachinaka; Shinya Imano; Takeshi Onoda, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/766,978

(22) Filed: Jan. 23, 2001

(65) Prior Publication Data

US 2001/0021346 A1 Sep. 13, 2001

Related U.S. Application Data

(62) Division of application No. 09/369,166, filed on Aug. 5, 1999, now Pat. No. 6,206,634.

(30) Foreign Application Priority Data

Aug. 7, 1998 (JP) .......................................... 10-224031

(51) Int. Cl.[7] ................................................ B23P 15/00
(52) U.S. Cl. .................................... 29/889.7; 29/889.72
(58) Field of Search ........................... 29/889.7, 889.72; 148/428, 425; 415/199.5, 200, 199.4; 416/241 R; 420/448, 436

(56) References Cited

U.S. PATENT DOCUMENTS

| | | | | |
|---|---|---|---|---|
| 5,370,497 A | * 12/1994 | Doi et al. | 415/199.5 |
| 5,480,283 A | * 1/1996 | Doi et al. | 415/199.5 |
| 5,749,228 A | 5/1998 | Shiga et al. | |
| 5,961,284 A | 10/1999 | Kuriyama et al. | |
| 5,964,091 A | * 10/1999 | Fukui et al. | 60/752 |
| 6,074,169 A | 6/2000 | Siga et al. | |
| 6,123,504 A | 9/2000 | Shiga et al. | |

FOREIGN PATENT DOCUMENTS

| | | |
|---|---|---|
| EP | 881 360 | 12/1989 |
| EP | 831 203 | 3/1998 |
| GB | 2 228 217 | 8/1990 |
| JP | 55-21507 | 2/1980 |
| JP | 1-202389 | 8/1989 |
| JP | 7-150316 | 6/1995 |
| WO | 92 21478 | 12/1992 |
| WO | 97 30272 | 8/1997 |

* cited by examiner

*Primary Examiner*—I Cuda Rosenbaum
(74) *Attorney, Agent, or Firm*—Mattingly, Stanger & Malur, P.C.

(57) ABSTRACT

A steam turbine blade made of Ti-base alloy comprising an $\alpha+\beta$ type phase in which a difference of a tensile strength is small between a blade portion and a dovetail portion, a tensile strength at a room temperature of the dovetail portion is equal to or more than 100 kg/mm$^2$ and a suitable toughness is commonly provided together with a strength, as a steam turbine blade having a length of 43 inch or more, a method of manufacturing the same, a steam turbine power generating plant and a low pressure steam turbine. In the steam turbine blade having a blade portion and a plurality of fork type dovetails, wherein the blade is made of Ti-base alloy structured such that a length of the blade portion is equal to or more than 52 inches with respect to a rotational speed 3000 rpm of the blade or equal to or more than 43 inches with respect to the rotational speed 3600 rpm, and a tensile strength at a room temperature of the dovetail is equal to or more than 100 kg/mm$^2$, preferably equal to or more than 110 kg/mm$^2$ and equal to or more than 96 % of the tensile strength at the room temperature of the blade portion.

16 Claims, 14 Drawing Sheets

| TEMPARATURE FOR SOLID SOLUTION TREATMENT (°C) | 800 | 850 | 900 |
| --- | --- | --- | --- |
| WATER COOLING | ○ | △ | □ |
| IMPACT AIR COOLING | ● | ▲ | — |

WING PORTION (1/4t)

| TEMPARATURE FOR SOLID SOLUTION TREATMENT (°C) | 800 | 850 |
|---|---|---|
| WATER COOLING | ○ | △ |
| IMPACT AIR COOLING | ⏀ | ⏃ |

METHOD OF MAKING STEAM TURBINE BLADE

This is a divisional application of U.S. Ser. No. 09/369.166, filed Aug. 5, 1999, now U.S. Pat. No. 6,206,634.

BACKGROUND OF THE INVENTION

1. Field of the Invention

The present invention relates to a steam turbine blade made of Ti-base alloy, a method of manufacturing the same, a steam turbine power generating plant using the same and a low pressure steam turbine.

2. Description of the Related Art

Conventionally, in a low pressure final stage of a steam turbine, there have been developed 12Cr steel for a blade having 33.5 inch length, Ti-6Al-4V for a blade having 40 inch length, and high strength 12Cr steel for a blade having 43 inch length which is the longest in the world as a machine corresponding to 50 Hz, however, a demand for improving an efficiency and compactifying the plant in accordance that the final blade stage is made long is increased more and more, so that it is required to further lengthen the blade. In order to achieve the requirement, a titanium alloy having a light weight and a high strength is indispensable in place of Ti-6Al-4V which has been practically used.

A titanium alloy in class of tensile strength 95 $kg/mm^2$ can sufficiently correspond to an increase of a centrifugal force caused by the blade having the increased length till the blade having 40 inch, however, in the blade having a length equal to or more than 45 inch, a titanium alloy in class of tensile strength 110 $kg/mm^2$ is required. As the titanium alloy having a tensile strength equal to or more than 110 $kg/mm^2$, there is a β type titanium alloy having an age hardening property, however, since the β type titanium alloy has a disadvantage, that is, a toughness is low, there is a problem in manufacturing a whole of the blade by this alloy. On the contrary, in an α+β type titanium alloy having a high toughness, a cooling speed for a solid solution treatment largely affects the strength in accordance that a dovetail of the blade becomes thick, so that the strength which can be obtained in a small steel lump can not be frequently realized in a large-sized product. Accordingly, it has been hard to securely obtain a titanium alloy in class of 110 $kg/mm^2$.

Further, in Japanese Patent Unexamined Publication No. 1-202389, there is described that a solid solution treatment is executed at a temperature equal to or less than 10 to 60° C. corresponding to a point of β transformation with respect to a condition for a heat treatment of Ti-6Al-6V-2Sn corresponding to an α+β type high strength Ti alloy, that is, at 867 to 917° C. and an age treatment is thereafter executed at 500 to 650° C., however, in accordance with this treatment, there has been a problem that the strength can be obtained in a thin blade profile portion, but the strength can not be secured in a thick dovetail portion in which a cooling speed is low.

Further, in Japanese Patent Unexamined Publication No. 7-150316, there is described a turbine blade made of Ti-base alloy containing 3 to 5% of Al, 2.1 to 3.7% of V, 0.85 to 3.15% of Mo and 0.85 to 3.15% of Fe as a material for the turbine blade, however, there is not indicated an age treatment.

SUMMARY OF THE INVENTION

An object of the present invention is to provide a steam turbine blade made of Ti-base alloy comprising an α+β type phase in which a difference of a tensile strength is small between a blade portion and a dovetail portion, a tensile strength at a room temperature of the dovetail portion is equal to or more than 100 $kg/mm^2$ and a suitable toughness is commonly provided together with a strength, as a steam turbine blade having a length of 43 inch or more, a method of manufacturing the same, a steam turbine power generating plant and a low pressure steam turbine.

In accordance with the present invention, there is provided a steam turbine blade having a blade portion and a plurality of fork type or inverted Christmas tree type dovetails, wherein the blade is made of Ti-base alloy structured such that a length of the blade portion is equal to or more than 52 inches with respect to a rotational speed 3000 rpm of the blade or equal to or more than 43 inches with respect to the rotational speed 3600 rpm, and a tensile strength at a room temperature of the dovetail is equal to or more than 100 $kg/mm^2$, preferably equal to or more than 110 $kg/mm^2$ and equal to or more than 96% of the tensile strength at the room temperature of the blade portion.

In accordance with the present invention, there is provided a steam turbine blade, wherein the steam turbine blade is made of Ti-base alloy containing Al 4 to 8 weight %, V 4 to 8 weight % and Sn 1 to 4 weight %, a tensile strength of the dovetail at a room temperature is equal to or more than 100 $kg/mm^2$, preferably equal to or more than 110 $kg/mm^2$, a V notch impact value (y) at a room temperature is equal to or more than a value (kg−m) calculated by a formula (−0.0213x+4.025), or the blade portion is structured such that a tensile strength (x) thereof at a room temperature is equal to or more than 105 $kg/mm^2$, the V notch impact value (y) at a room temperature is equal to or more than a value (kg−m) calculated by a formula (−0.0196x+3.93) and the tensile strength of the dovetail at a room temperature is equal to or more than 96% of the tensile strength of the blade portion at a room temperature.

In accordance with the present invention, there is provided a steam turbine blade, where in the blade is made of Ti-base alloy structured such that a length of the blade portion is equal to or more than 52 inches with respect to a rotational speed 3000 rpm of the blade or equal to or more than 43 inches with respect to the rotational speed 3600 rpm and Al 4 to 8 weight %, V 4 to 8 weight % and Sn 1 to 4 weight % are contained, the blade portion is structured such that a tensile strength (x) at room temperature is equal to or more than 105 $kg/mm^2$ and V notch impact value (y) at a room temperature is equal to or more than a value (kg-m) calculated by a formula (−0.0196x+3.93), or the dovetail is structured such that a tensile strength (x) at a room temperature is equal to or more than 100 $kg/mm^2$ and a V notch impact value (y) at a room temperature is equal to or more than a value (kg−m) calculated by a formula (−0.0213x+4.025).

In accordance with the present invention, there is provided a method of manufacturing a steam turbine blade made of Ti-base alloy, wherein a solid solution treatment and an age treatment is performed so as to cool by water after heating in a range connecting four points shown by reference symbols A (605° C. and 855° C.), B (590° C. and 790° C.), C (410° C. and 790° C.) and D (410° C. and 855° C.) expressed by (an age temperature and a solid solution treatment temperature) shown in FIG. 1 of this application, wherein the area expressed by (the age temperature and the solid solution treatment temperature) is structured such that a solid solution treatment and an age treatment is performed so as to cool by water after heating in a range connecting four points shown by reference symbols E (525° C. and 855°

C.,), F (510° C. and 790° C.), G (410° C. and 790° C.) and H (410° C. and 855° C.) shown in FIG. 2 of this application, wherein the dovetail portion is roughly processed to a state close to a final shape prior to a final heat treatment and next a solid solution treatment and an age treatment is performed so as to cool by water after heating in a range connecting four points shown by reference symbols J (685° C. and 855° C.), K (585° C. and 790° C.), L (410° C. and 790° C.) and M (410° C. and 855° C.) expressed by (an age temperature and a solid solution treatment temperature) shown in FIG. 3 of this application, and wherein the dovetail portion is roughly processed to a state close to a final shape prior to a final heat treatment and next a solid solution treatment and an age treatment is performed so as to cool by water after heating in a range connecting four points shown by reference symbols N (575° C. and 855° C.), O (560° C. and 790° C.), P (410° C. and 790° C.) and Q (410° C. and 855° C.) expressed by (an age temperature and a solid solution treatment temperature) shown in FIG. 4 of this application.

In accordance with the present invention, there is provided a steam turbine power generating plant comprising a high pressure turbine, an intermediate pressure turbine and a low pressure turbine, wherein a rotor blade at a final stage of the low pressure turbine has a blade portion and a plurality of fork-like dovetails and is constituted by the steam turbine blade mentioned above.

In accordance with the present invention, there is provided a low pressure steam turbine comprising a rotor shaft, a rotor blade provided on the rotor shaft, a stator blade guiding an inlet of a steam to the rotor blade and an internal casing holding the stator blade, wherein the rotor blade is structured in a dual current such that six stages of the rotor blades are provided in each of right and left portions of the steam turbine in a symmetrical manner and a first stage is provided in a center portion of the rotor shaft, and a rotor blade at the final stage is constituted by the steam turbine blade mentioned above.

The Ti-base alloy is heated to a temperature area having an α+β phase and held at the temperature area after a hot forging and thereafter is forcibly cooled (solid solution treated), whereby an α phase and α' martensite two phase structure is refined and homogenized, so that a high ductility and a high toughness can be obtained. Further, due to the successive aging treatment, the α' martensite is decomposed to the α+β two phase so as to form a duplex state comprising a pro-eutectoid α grain and an old β grain from which the α phase is precipitated due to the aging (aging hardening), whereby a high tensile strength and a high fatigue strength can be obtained.

The temperature for the solid solution treatment is properly selected in a range between 800 and 900° C. corresponding to a temperature equal to or less than a β transformation point (about 927° C.) particularly in the case of Ti-6%Al-6%V-2%Sn among the Ti-base alloy containing 4 to 8% of Al, 4 to 8% of V and 1 to 4% of Sn. In particular, the temperature of 790 to 855° C. is more preferable by combination. At the temperature equal to or more than the β transformation point, a reduction of the ductility and the toughness is caused due to a roughness of a crystal grain and a reduction of an amount of the pro-eutectoid α grain. Further, when the temperature for the solid solution treatment is set too low, the amount of the pro-eutectoid α grain is increased as well as the hot forging structure is left, so that a proper strength can not be obtained.

The subsequent temperature for the aging treatment is properly selected in a range between 500 and 600° C. The higher the temperature for the aging treatment is, the more the tensile strength is reduced, so that the ductility and the toughness are improved. In particular, a special combination at the temperature between 410 and 685° C. is preferable by a combination with the temperature for the solid solution treatment.

The reasons of the preferable range for the components of the Ti-base alloy used in the present invention are as follows.

Al: This is a representative α stabilizing element and is an indispensable additional element for the (α+β) type Ti-base alloy. It is hard to become the (α+β) type alloy when an amount of Al is less than 4%, and it is hard to obtain a sufficient strength for a material. On the contrary, when an amount of Al is over 10%, Ti3Al corresponding to an intermetallic compound is generated and a toughness is significantly reduced, so that it is not preferable. In particular, an amount of Al is preferably set to 4 to 8%.

V: This is an important additional element for reducing the β transformation point as well as stabilizing the β phase. This has an effect of restricting a rapid generation and increase of the α phase after an annealing or the solid solution treatment so as to finely precipitate the α phase. In the case that a contained amount of V is less than 4%, it is not possible to sufficiently reduce the β transformation point and the effect of stabilizing the β phase is reduced, so that it is impossible to obtain the effect of restricting the generation of the α phase during the annealing or after the solid solution treatment. On the contrary, when a contained amount of V is over 10%, the stability of the β phase becomes too large and it is hard to obtain a preferable two phase (α+β) structure, so that it is insufficient in view of a strength. In particular, the contained amount of V is preferably set to 4 to 8%.

Sn: This has an effect of stabilizing the β phase and simultaneously restricting a grain growth. Accordingly, as well as Al, in addition that this is important for restricting a rapid generation and increased of the α phase after the annealing or after the solid solution treatment so as to finely precipitate the α phase, this has an effect of refining the whole of the structure, so that this is an additional component occupying an important position for strengthening. When the contained mount of Sn is less than 1%, a crystal grain is enlarged during the annealing or after the solid solution treatment and it is hard to obtain the desired effect mentioned above. On the contrary, when the contained amount of Sn is over 5%, the β phase is stabilized too much and it is hard to obtain the preferable two phase structure, so that an improvement of a higher strength can not be desired. In particular, the contained amount of Sn is preferably set to 1 to 4%.

The Ti-base alloy mentioned above is employed for the final stage rotor blade in the low pressure turbine at a blade length of 43 inches or more with respect to 3600 rpm and 52 inches or more with respect to 3000 rpm, in particular, an alloy comprising 5 to 7% of Al, 5 to 7% of V, 1 to 3% of Sn, 0.2 to 1.5% of Fe, 0.20% or less of O, 0.3 to 1.5% of Cu and the remainder of Ti, and it is preferable to apply the same heat treatment as mentioned above.

The conditions mentioned above can be applied to the following inventions.

In accordance with the present invention, there is provided a steam turbine power generating plant mentioned above, wherein the high pressure turbine and the intermediate pressure turbine or the high and intermediate pressure turbine are structured such that a temperature of an inlet for a steam to the first stage rotor blade is in a range of 538 to 660° C. (preferably, 593 to 620° C., 620 to 630° C. and 630 to 640° C.), the low pressure turbine is structured such that a temperature of an inlet for a steam to the first stage rotor blade is in a range of 350 to 400° C., and a rotor shaft exposed to the steam inlet temperature of the high pressure turbine and the intermediate pressure turbine or the high and intermediate pressure turbine or a whole of the rotor shaft, a rotor blade, a stator blade and an internal casing is constituted by a high strength martensite steel containing 8 to 13 weight % of Cr, or the first stage, or the second stage or the third stage of the rotor blade among them is constituted by a Ni-base alloy.

It is preferable that the high pressure turbine, the intermediate pressure turbine or the high and intermediate pressure turbine in accordance with the present invention has a rotor blade provided in the rotor shaft, a stator blade guiding an inlet of a steam to the rotor blade and an internal casing holding the stator blade, a temperature of the steam flowing into the first stage of the rotor blade is 538 to 660° C. and a pressure thereof is 250 $kgf/cm^2$ or more (preferably, 246 to 316 $kgf/cm^2$) or 170 to 200 $kgf/cm^2$, the rotor shaft or the rotor shaft, the rotor blade and at least first stage of the stator blade is constituted by a high strength martensite steel having a whole tempered martensite structure containing 8.5 to 13 weight % (preferably, 10.5 to 11.5 weight %) of Cr corresponding to 10 $kgf/mm^2$ of $10^5$ time creep breaking strength or more (preferably, 17 $kgf/mm^2$ or more) at a temperature in correspondence to each of the steam temperatures (preferably, 566° C., 593° C., 610° C., 625° C., 640° C., 650° C. and 660° C.), or the first stage or the second stage or the third stage of the rotor lade among them is constituted by the Ni-base alloy, and the internal casing is constituted by a martensite casting steel containing 8 to 9.5 weight % of Cr having 10 $kgf/mm^2$ of $10^5$ time creep breaking strength or more (preferably, 10.5 $kgf/mm^2$ or more) at a temperature in correspondence to each of the steam temperatures, thereby heating the steam flowing out from the high pressure steam turbine, the intermediate pressure steam turbine or the high pressure side turbine so as to heat to a level equal to or more the high pressure side inlet temperature and feed to the intermediate pressure side turbine, whereby the high and intermediate pressure integral type steam turbine can be obtained.

In the high pressure turbine and the intermediate pressure turbine or the high and intermediate pressure integral type steam turbine, the rotor shaft of the first stage of at least one of the rotor blade and the stator blade is preferably constituted by a high strength martensite steel containing in weight 0.05 to 0.20% of C, 0.6% or less, preferably 0.15% of Si, 1.5% or less, preferably 0.05 to 1.5% of Mn, 8.5 to 13%, preferably 9.5 to 13% of Cr, 0.05 to 1.0% of Ni, 0.05 to 0.5%, preferably 0.05 to 0.35% of V, 0.01 to 0.20% of at least one of Nb and Ta, 0.01 to 0.1%, preferably 0.01 to 0.06% of N, 1.5% or less, preferably 0.05 to 1.5% of Mo, 0.1 to 4.0%, preferably 1.0 to 4.0% of W, 10% or less, preferably 0.5 to 10% of Co, 0.03% or less, preferably 0.0005 to 0.03% of B and 78% or more of Fe, and it is preferable to correspond to the steam temperature of 593 to 660° C., or it is preferable to be constituted by a high strength martensite steel containing 0.1 to 0.25% of C, 0.6% or less of Si, 1.5% or less of Mn, 8.5 to 13% of Cr, 0.05 to 1.0% of Ni, 0.05 to 0.5% of V, 0.10 to 0.65% of W, 0.01 to 0.20% of at least one of Nb and Ta, 0.1% or less of Al, 1.5% or less of Mo, 0.025 to 0.1% of N and 80% or more of Fe, and it is preferable to correspond to a temperature less than 600 to 620° C. Said internal casing is preferably constituted by a high strength martensite steel containing in weight 0.06 to 0.16% of C, 0.5% or less of Si, 1% or less of Mn, 0.2 to 1.0% of Ni, 8 to 12% of Cr, 0.05 to 0.35% of V, 0.01 to 0.15% of at least one of Nb and Ta, 0.01 to 0.8% of N, 1% or less of Mo, 1 to 4% of W, 0.0005 to 0.003% of B and 85% or more of Fe.

In the steam turbine power generating plant in accordance with the present invention, the high pressure steam turbine is structured such that the rotor blade is provided at seven stages or more, preferably, at nine to twelve stages, and the first stage is constructed in a dual current, the intermediate pressure steam turbine is structured such that the rotor blade is provided at six or more stages in a symmetrical manner in each of the right and left lines, and the first stage is provided in a center portion of the rotor shaft so as to form a dual current construction, the high and intermediate pressure integral type steam turbine is structured such that the high pressure side rotor blade is provided at six stages or more, preferably seven stages or more and more preferably eight stages or more and the intermediate pressure side rotor blade is provided at five stages or more, preferably six stages or more, and the low pressure steam turbine is structured such that the rotor blade is provided at five stages or more, preferably six stages or more and more preferably eight to ten stages in a symmetrical manner in each of the right and left lines and the first stage is provided in a center portion of the rotor shaft so as to form a dual current construction.

The low pressure turbine in accordance with the present invention is structured such that the steam inlet temperature to the first stage rotor blade is preferably set to 350 to 400° C., and the rotor shaft thereof is preferably constituted by Ni-Cr-Mo-V low alloy steel which is structured such that a distance (L) between centers of bearings is 6500 mm or more (preferably, 6600 to 7500 mm), a minimum diameter (D) at a portion in which the stator blade is provided is 750 to 1300 mm (preferably, 760 to 900 mm), and a value (L/D) is 5 to 10, preferably 7 to 10 (more preferably, 8.0 to 9.0) and 3.25 to 4.25 weight % of Ni is contained.

The low pressure steam turbine in accordance with the present invention is preferably structured by any one of the following items or a combination thereof. A length of the blade portion is 80 to 1300 mm from an upstream side of the steam current to a downstream side, a diameter of the mounting portion of the rotor blade in the rotor shaft is greater than a diameter of the portion corresponding to the stator blade, a width in an axial direction of the mounting portion in the downstream side is increased preferably at three or more stages (more preferably, four to seven stages) step by step in comparison with the upstream side and a rate with respect to the length of the blade portion is 0.2 to 0.8 (preferably, 0.3 to 0.55) and is made smaller from the upstream side to the downstream side. Said length of the blade portion in each of the adjacent stages is made greater in the downstream side in comparison with the upstream side, and the ratio thereof is in a range of 1.2 to 1.8 (preferably, 1.4 to 1.6) and the ratio is gradually made greater in the downstream side. The width in an axial direction of the portion corresponding to the stator blade portion in the rotor shaft is made preferably three stages or more (more preferably, four to seven stages) greater in the downstream side in comparison with the upstream side, a rate with respect to the length of the downstream side blade portion in the rotor blade is in a range of 0.2 to 1.4 (preferably, 0.25 to 1.25, in particular, 0.5 to 0.9) and the rate is made smaller to the downstream side step by step.

Hereinafter, the other constituting material of the low pressure turbine will be described below.

(1) The low pressure steam turbine rotor shaft is preferably constituted by a low alloy steel having a fully temper bainite structure containing in weight 0.2 to 0.35% of C, 0.1% or less of Si, 0.2% or less of Mn, 3.25 to 4.25% of Cr, 0.1 to 0.6% of Mo, and 0.05 to 0.25% of V, and is preferably manufactured in accordance with the same manufacturing method as that of the high pressure and intermediate pressure rotor shaft mentioned above. In particular, it is preferable to manufacture in a super cleaning manner which uses a raw material having an impurity such as P, S, As, Sb, Sn and the like which is made as low as possible in addition to 0.01 to 0.5% of Si and 0.05 to 0.2% of Mn, whereby a total amount of the impurity in the employed raw material is reduced to a level of 0.025 or less. 0.010% or less of P and S, 0.005% or less of Sn and As and 0.001% of Sb are preferable.

(2) The other stages than the final stage of the low pressure turbine plate and the nozzle are preferably constituted by a fully temper martensite steel containing 0.05 to 0.2% of C, 0.1 to 0.5% of Si, 0.2 to 1.0% of Mn, 10 to 13% of Cr, 0.04 to 0.2% of Mo.

(3) The internal and external casings for the low pressure turbine are both constituted by a carbon casting steel containing 0.2 to 0.3% of C, 0.3 to 0.7% of Si and 1% or less of Mn.

(4) A main steam stopper valve casing and a steam adjusting valve casing are constituted by a fully temper martensite steel containing 0.1 to 0.2% of C, 0.1 to 0.4% of Si, 0.2 to 1.0% of Mn, 8.5 to 10.5% of Cr, 0.3 to 1.0% of Mo, 1.0 to 3.0% of W, 0.1 to 0.3% of V, 0.03 to 0.1% of Nb, 0.03 to 0.08% of N and 0.0005 to 0.003% of B.

DESCRIPTION OF THE PREFERRED EMBODIMENTS

[Embodiment 1]

Figure 1:
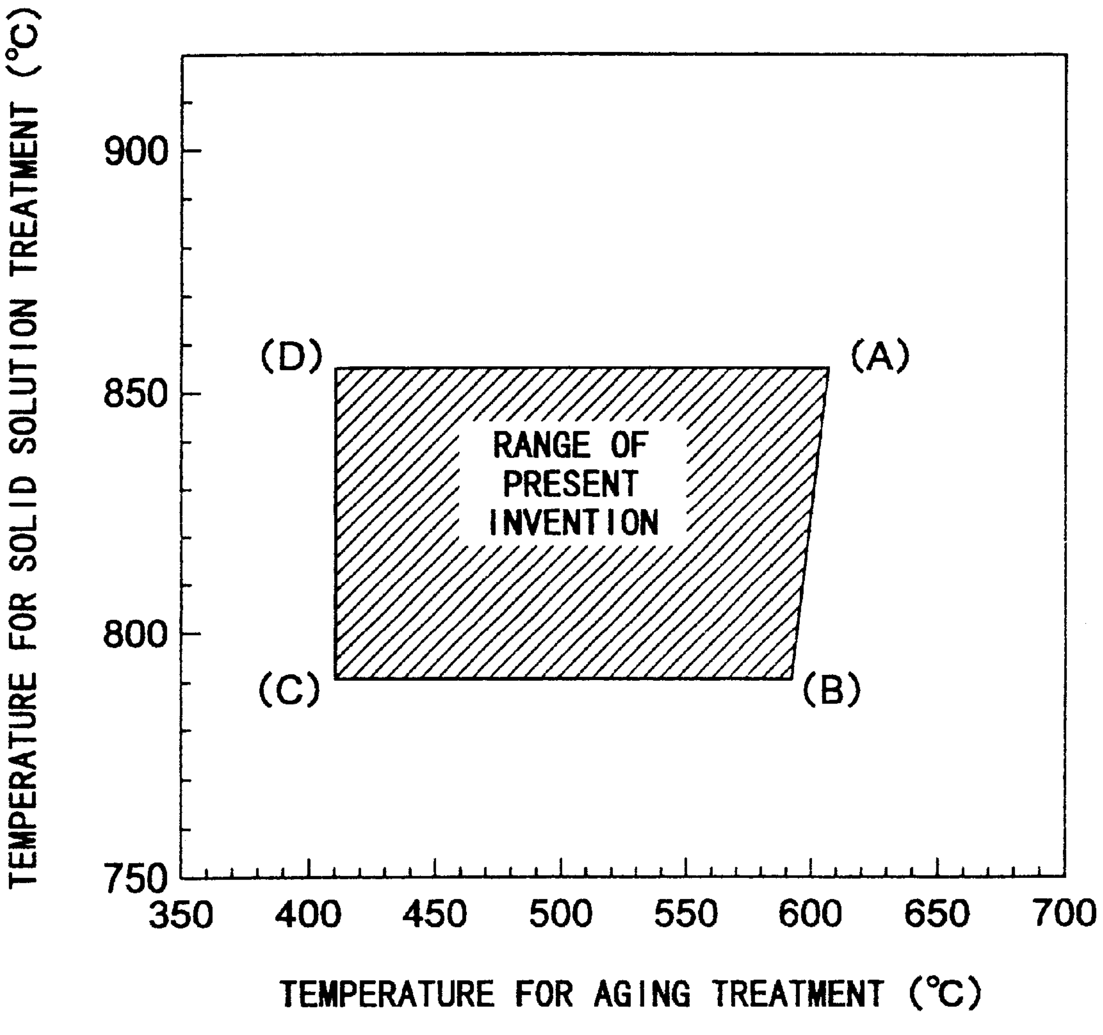
FIG. 1 is a graph which shows a relation between a temperature for an aging treatment and a temperature for a solid solution treatment for obtaining a target tensile strength of a solid solution treated and water cooled material.

As a material for a steam turbine blade in accordance with the present invention, an α+β type Ti alloy comprising 5.89 weight % of Al, 5.98 weight % of V, 0.33 weight % of Fe, 0.16 weight % of O, 2.31 weight % of Sn, 0.40 weight % or Cu and the remainder Ti is employed. A pro-eutectoid α phase is 48 to 55% at 800° C. of a temperature for a solid solution treatment, 37 to 46% at 850° C. and 22 to 28% at 900° C.

A forged product (400 mm, 190 mm and 110 mm) having a blade portion length 45 inches, forming the thickest portion of a long blade and made of a dovetail shape material is prepared, a solid solution treatment at 800 to 900° C. and for one hour and an aging treatment at 500 to 600° C. and for four hours are performed, test pieces are sampled from a ½ t portion corresponding to a middle of the thickness of a dovetail portion and a ¼ t portion corresponding to a blade portion, and a tensile test and an impact test are performed. The impact test is performed in a condition that a shape is a V notch and a cross sectional area is 0.8 $cm^2$. In this case, a cooling operation in the solid solution treatment is performed by two ways comprising a water cooling and an air impact cooling. A strength in accordance with the cooling speed is estimated in correspondence to a test piece sampling position.

Table 1 shows a tensile strength and an impact absorbing energy at the ¼ t portion of the water cooled material employing the water cooling as the solid solution treatment, and Table 2 shows a tensile strength and an impact absorbing energy at the ½ t portion. At the ¼ t portion where the cooling speed is high, a target strength 110 $kg/mm^2$ or more can be satisfied in any of the heat treatments, however, the strength is reduced in accordance with an increase of the temperature for the aging treatment and a tolerance is reduced. On the contrary, at the ½ t portion where the cooling speed is low, the target strength 110 $kg/mm^2$ or more can not satisfied in the solid solution treatment at 900° C., however, it can be substantially satisfied in a combination of the temperature for the aging treatment and the solid solution treatment at 800° C. and 500° C., 600° C. and 850° C., and 500° C. and 600° C. Further, comparing with the result at the ¼ t portion where the cooling speed is high, the cooling speed is less influenced as the temperature for the solid solution treatment is low, the temperature for the aging treatment is less influenced as the temperature for the solid solution treatment is high. On the contrary, with respect to the impact absorbing energy, there is no significant difference seen, so that it is considered that a reduction of a fracture toughness value due to a security of the strength is a little. In accordance with these results, with arranging the relation between the temperature for the aging treatment and the temperature for the solid solution treatment for obtaining the target strength, in the case of the water cooling at the solid solution treatment, a hatched area shown in FIG. 1, that is, a range connecting four points comprising A (605° C., 855° C.), B (590° C., 790° C.), C (410° C., 790° C.) and D (410° C., 855° C.) is preferable.

Further, as mentioned above, the strength in the dovetail portion is about 99% the strength in the blade portion at the temperature For the solid solution treatment of 800° C. or less, however, when the temperature is increased to 850° C. and 900° C., the strength is reduced to 96% and 92%, respectively. Accordingly, the temperature for the solid solution treatment and the temperature for the aging treatment are adjusted as shown in FIG. 1, whereby the strength in the dovetail portion is 96% or more that of the blade portion.

TABLE 1

| SOLID SOLUTION TREATMENT | AGING TREATMENT | TENSILE STRENGTH ($kg/mm^2$) | IMPACT ABSORBING ENERGY (kg-m) |
|---|---|---|---|
| 800° C. × 1 h, WQ | 500° C. × 4 h | 118.7 | 1.61 |
| | 600° C. × 4 h | 110.0 | 1.78 |
| 850° C. × 1 h, WQ | 500° C. × 4 h | 118.2 | 1.74 |
| | 600° C. × 4 h | 113.6 | 1.72 |
| 900° C. × 1 h, WQ | 500° C. × 4 h | 116.2 | 2.13 |
| | 600° C. × 4 h | 112.2 | 1.76 |

NOTE)
MECHANICAL PROPERTY OF PORTION OF THICKNESS ¼ t

TABLE 2

| SOLID SOLUTION TREATMENT | AGING TREATMENT | TENSILE STRENGTH ($kg/mm^2$) | IMPACT ABSORB-ING ENERGY (kg-m) | RATIO OF TENSILE STRENGTH WITH RESPECT TO ¼ t |
|---|---|---|---|---|
| 800° C. × 1 h, | 500° C. × 4 h | 117.2 | 1.62 | 0.9874 |
| WQ | 600° C. × 4 h | 109.2 | 1.70 | 0.9927 |
| 850° C. × 1 h, | 500° C. × 4 h | 113.5 | 1.70 | 0.9602 |
| WQ | 600° C. × 4 h | 110.1 | 1.68 | 0.9692 |
| 900° C. × 1 h, | 500° C. × 4 h | 106.9 | 2.12 | 0.9200 |
| WQ | 600° C. × 4 h | 105.9 | 1.78 | 0.9439 |

NOTE)
MECHANICAL PROPERTY OF PORTION OF THICKNESS ½ t

Figure 2:
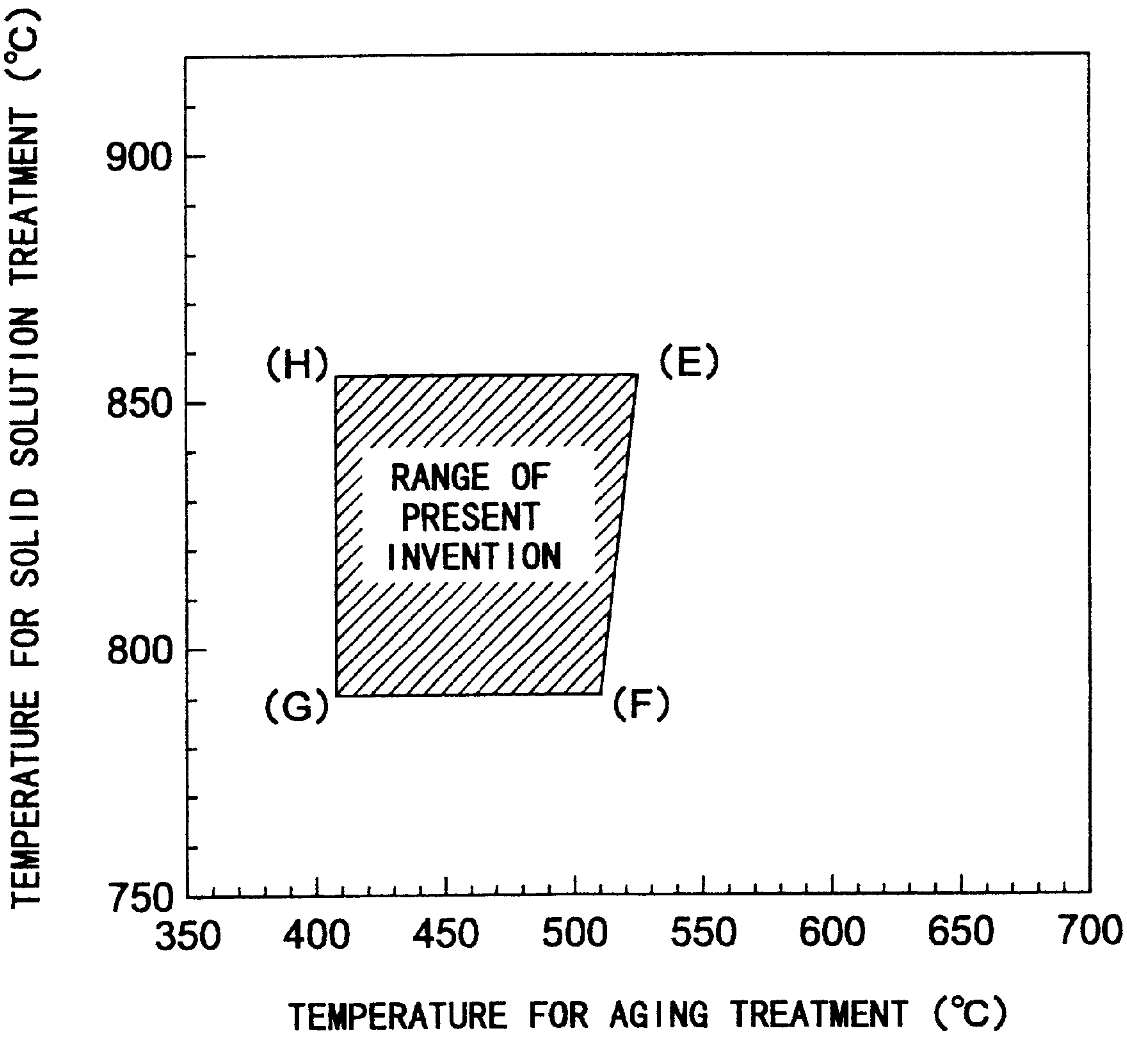
FIG. 2 is a graph which shows a relation between a temperature for an aging treatment and a temperature for a solid solution treatment for obtaining a target tensile strength of a solid solution treated and air cooled material.

Table 3 shows a tensile strength and an impact absorbing energy at a ½ t portion (a portion where the cooling speed is the lowest) in accordance with the impact air cooling. In the same manner as that of the water cooled material, with arranging the relation between the temperature for the aging treatment and the temperature for the solid solution treatment for obtaining the target strength, in the case that the impact air cooling operation is performed at the solid solution treatment, in order to reduce the strength difference between the dovetail portion and the blade portion mentioned above, a hatched area shown in FIG. 2, that is, the temperature for the aging treatment and the temperature for the solid solution treatment in a range connecting four points comprising E (525° C., 855° C.) , F (510° C., 790° C.), G (410° C., 790° C.) and H (410° C., 855° C.) is preferable. As shown in Table 3, it is understood that an excellent strength 96% or more that in the blade portion can be obtained as the strength corresponding to the dovetail portion.

A 0.02% proof stress of the 800° C. impact air cooled material is 93 to 101 $kg/mm^2$ at the ¼ t portion and 93 to 100 $kg/mm^2$ at the ½ t portion, a 0.2% proof stress is 103 to 106 $kg/mm^2$ at the ¼ t portion and 96 to 107 $kg/mm^2$ at the ½ t portion, an elongation rate is 15 to 17% in any cases, and a drawing rate is 22 to 43% at the ¼ t portion, 40 to 50% at the ½ t portion. Further, Hv hardness is 335 to 356.

TABLE 3

| SOLID SOLU-TION TREAT-MENT | AGING TREAT-MENT | POR-TION | TENSILE STRENGTH ($kg/mm^2$) | IMPACT AB-SORBING ENERGY (kg-m) | RATIO OF TENSILE STRENGTH WITH RESPECT TO ¼ t |
|---|---|---|---|---|---|
| 800° C. × | 500° C. × | ¼ t | 112.8 | 1.83 | — |
| 1 h | 4 h | ½ t | 110.8 | 1.88 | 0.9823 |
| | 600° C. × | ¼ t | 108.3 | 1.85 | — |
| | 4 h | ½ t | 104.0 | 1.81 | 0.9603 |
| 850° C. × | 500° C. × | ¼ t | 112.0 | 1.88 | — |
| 1 h | 4 h | ½ t | 110.4 | 1.92 | 0.9857 |
| | 600° C. × | ¼ t | 109.3 | 1.87 | — |
| | 4 h | ½ t | 108.7 | 1.94 | 0.9945 |

Figure 3:
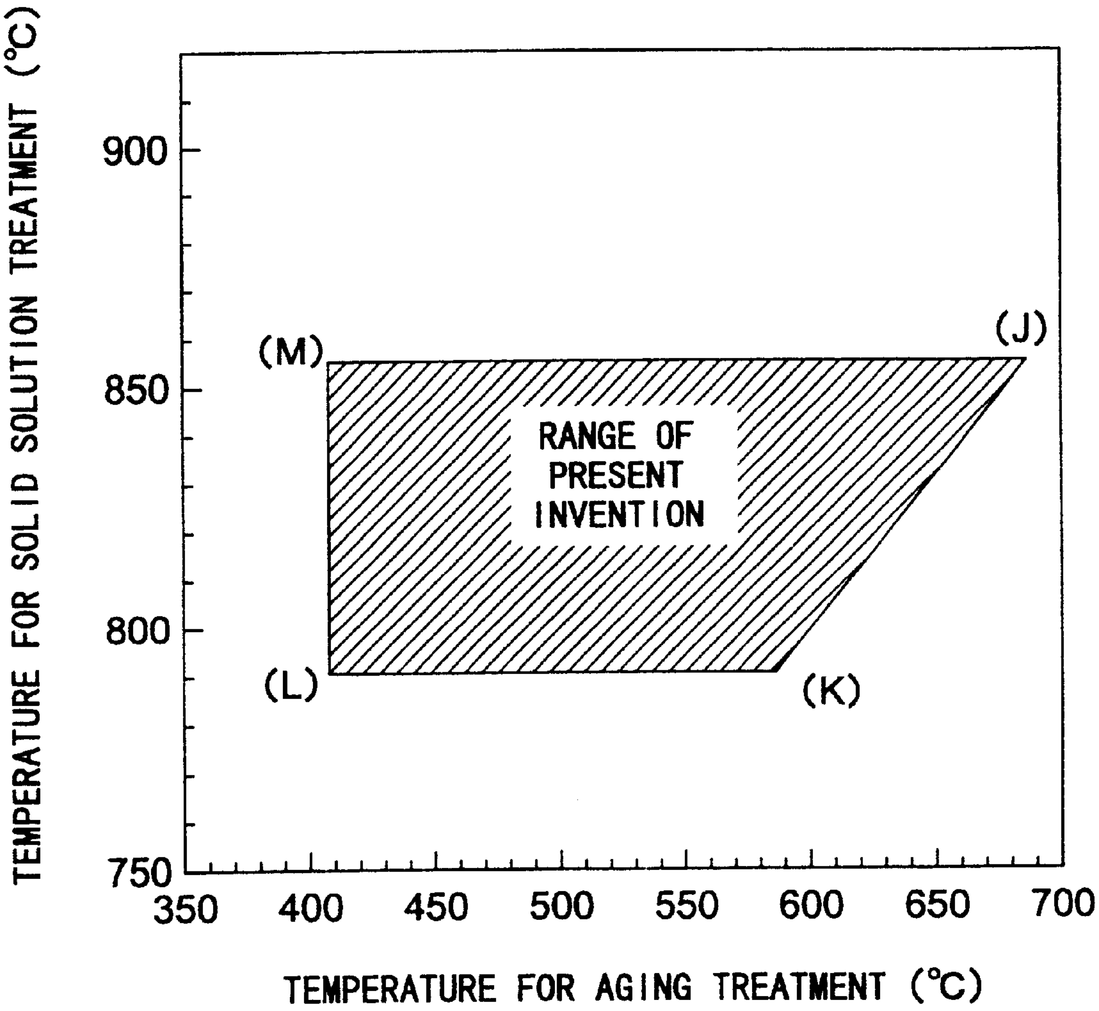
FIG. 3 is a graph which shows a relation between a temperature for an aging treatment and a temperature for a solid solution treatment for obtaining a target tensile strength of a solid solution treated and water cooled material after a dovetail rough process.
Figure 4:
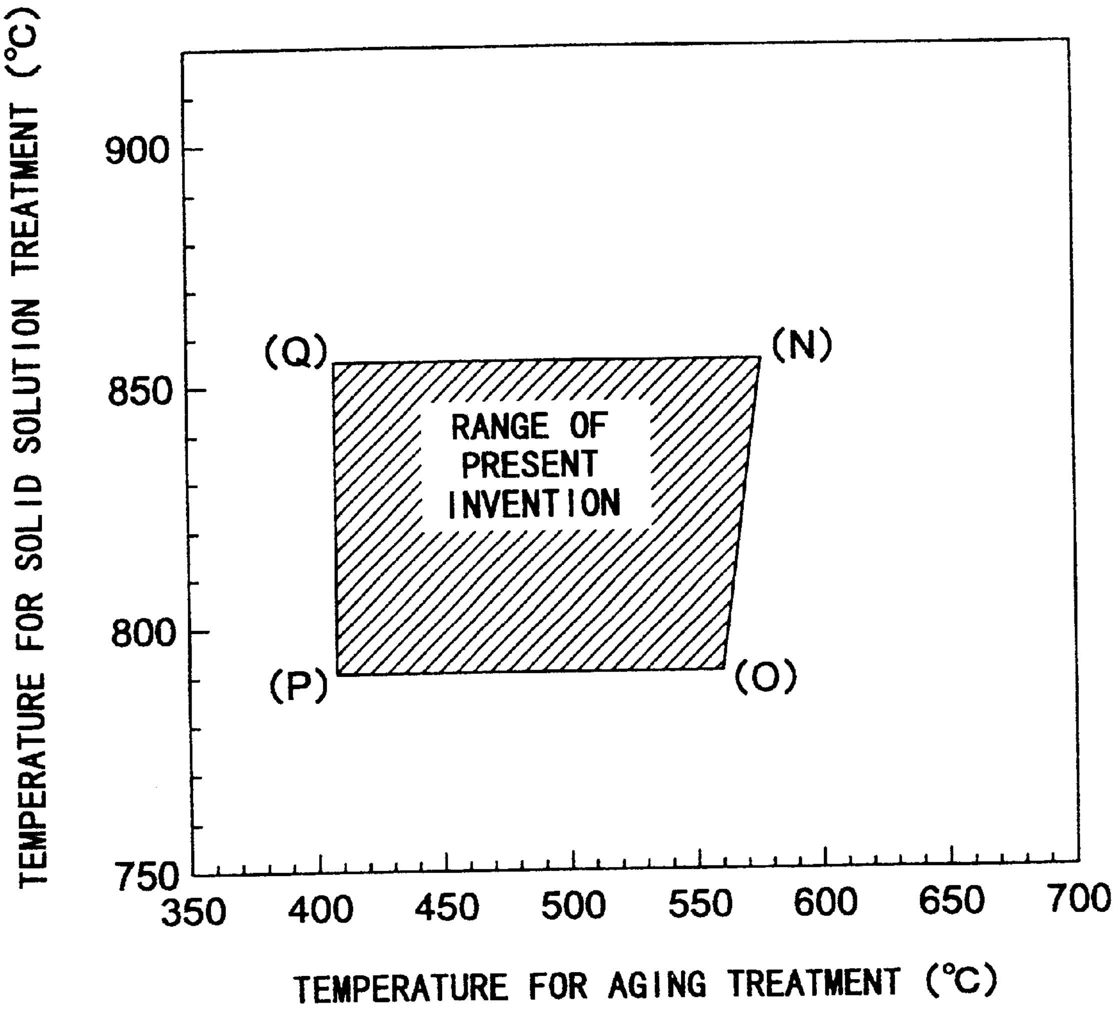
FIG. 4 is a graph which shows a relation between a temperature for an aging treatment and a temperature for a solid solution treatment for obtaining a target tensile strength of a solid solution treated and air cooled material after a dovetail rough process.

On the contrary, as a method for increasing the cooling speed at the thick portion, there is a rough working of the dovetail before the heat treatment, that is, a method of forming a slit in correspondence to each of forks when the dovetail is formed in a fork type. In this method, since the interval between the slits is smaller than ¼ t and five to ten slits are required, a cooling operation is performed from a front surface and a whole cooling speed is in a level equal to or more than that of the ¼ t portion before worked. Accordingly, with arranging the relation between the temperature for the aging treatment and the temperature for the solid solution treatment for obtaining the target strength at the thick portion and the thin portion in accordance with the result of Table 1, in the case that the solid solution treatment and the water cooling are performed after forming the slit, a heat treatment in a hatched area shown in FIG. 3, that is, a range connecting four points comprising J (685° C., 855° C.), K (585° C., 790° C.), L (410° C., 790° C.) and M (410° C., 855° C.) can be performed. The same matter can be applied to the case of the impact air cooling at the solid solution treatment, and with arranging the relation between the temperature for the aging treatment and the temperature for the solid solution treatment for obtaining the target strength in accordance with the result of Table 3, in the case that the solid solution treatment and the impact air cooling are performed after forming the slit, a heat treatment in a hatched area shown in FIG. 4, that is, a range connecting four points comprising N (575° C., 855° C.) O (560° C., 790° C.), P (410° C., 790° C.) and Q (410° C., 855° C.) can be performed.

In this case, a shape of the dovetail includes a fork type, an inverted Christmas tree type and a saddle type, and the structure can correspond to any of them.

Figure 5:
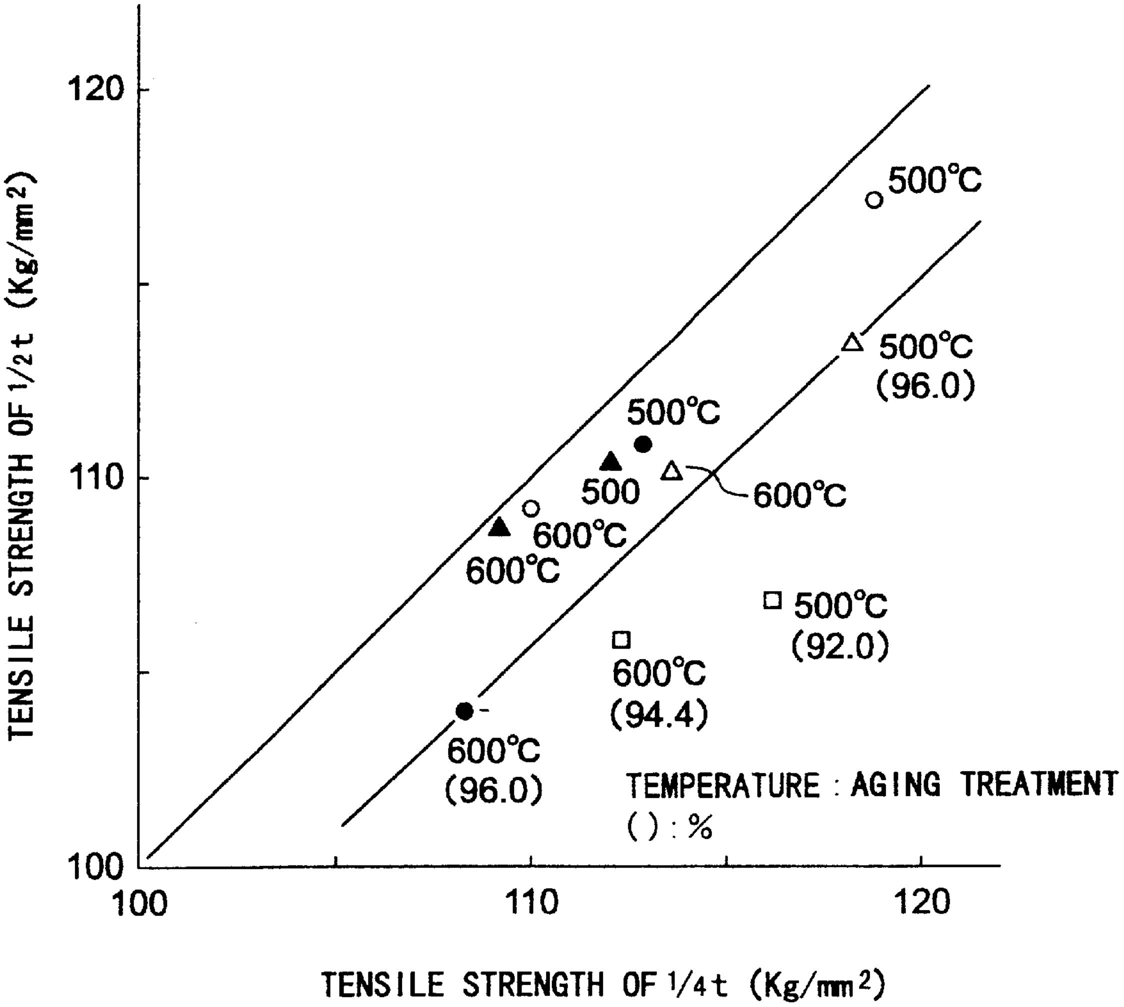
FIG. 5 is a graph which shows a relation of a tensile strength between ½ t and ¼ t.

FIG. 5 is a graph which shows a relation of the tensile strength between the ½ t and the ¼ t. As shown in FIG. 5, when the temperature for the solid solution treatment is 800° C. and 850° C., a difference in the temperature for the solid solution temperature caused by the thickness is small, the strength in the thickness of ½ t is 96.0% or more the thickness of ¼ t. However, in the solid solution treatment at 900° C., it is influenced by the thickness and the strength is lowered to 94.4% or less, so that it is not preferable.

Figure 6:
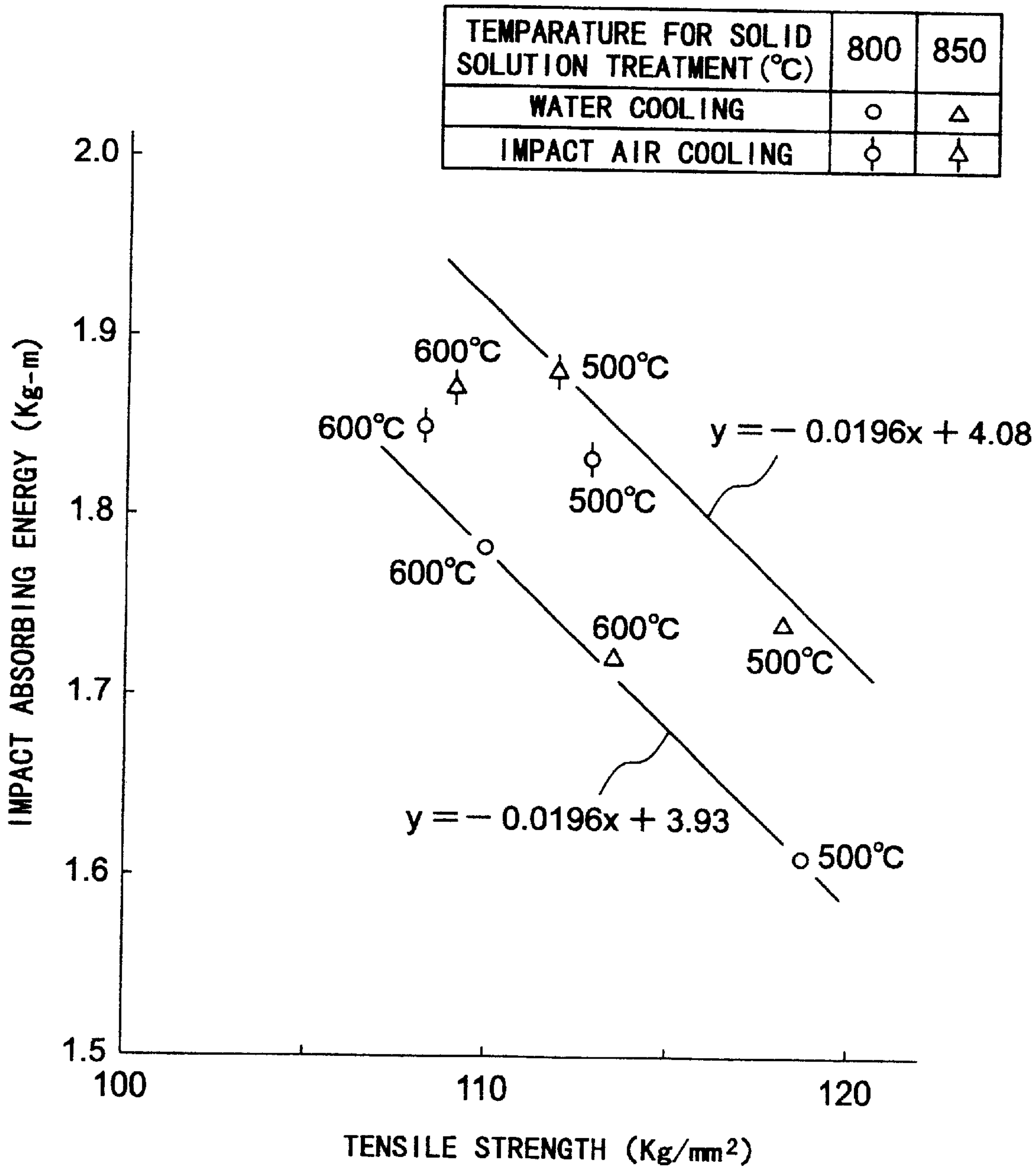
FIG. 6 is a graph which shows a relation between an impact absorption energy and a tensile strength.

FIG. 6 is a graph which shows a relation between the impact absorbing energy (y) and the tensile strength (x) in the ¼t corresponding to the thickness of the blade portion. A bottommost line corresponds to a formula $y=-0.0196x+3.93$, an uppermost line corresponds to a formula $y=-0.0196x+4.08$, and the Ti-base alloy in the present embodiment is set such that the portion corresponding to the blade portion is within the range formed by these lines, so that the blade having a little influence caused by the difference in thickness can be obtained.

Figure 7:
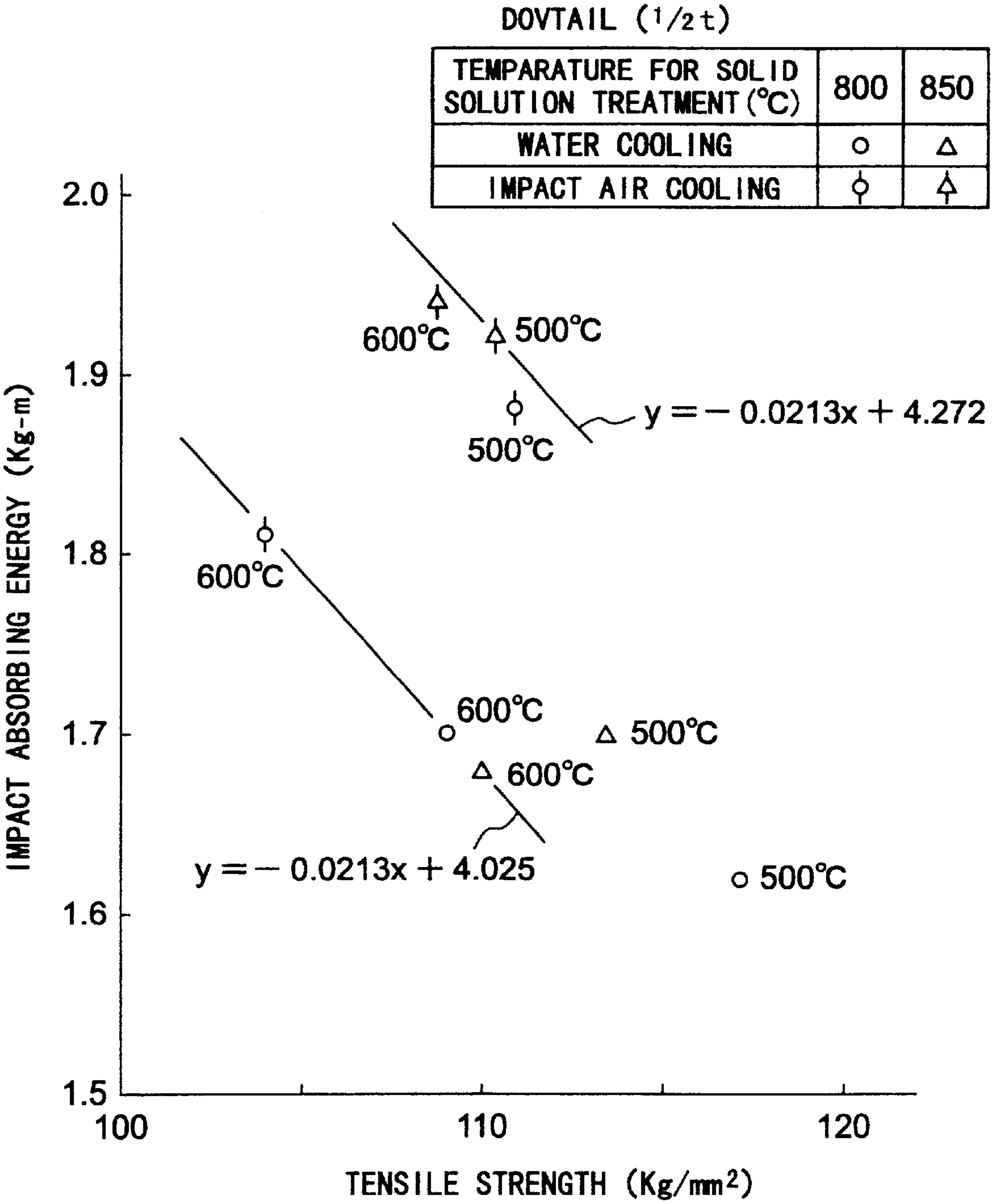
FIG. 7 is a graph which shows a relation between an impact absorption energy and a tensile strength.

FIG. 7 is a graph which shows a relation between the impact absorbing energy (y) and the tensile strength (x) in the ½ t corresponding to the thickness of the dovetail. A bottommost line corresponds to a formula y=−0.0213x+4.025, an uppermost line corresponds to a formula y=−0.0213x+4.272, and the Ti-base alloy in the present embodiment is set such that the portion corresponding to the dovetail is within the range formed by these lines, so that the blade having a little difference in the tensile strength and the impact absorbing energy with respect to the blade portion mentioned above can be obtained.

Further, a value of the impact absorbing energy in the ½ t and the ¼ t is higher in the blade portion than the dovetail portion in the case of the water cooled material, and higher in the dovetail portion than the blade portion in the case of the impact air cooled material, and in both cases, it becomes high within 5%.

[Embodiment 2]

Figure 8:
FIG. 8 is a perspective view of a steam turbine blade.

FIG. 8 is a perspective view of a steam turbine blade at the final stage of the low pressure turbine for the steam turbine having a length 43 inches of a blade portion for 3600 rpm and a steam temperature of 538 to 650° C. A dovetail 52 is formed by eight forks, and in the case of a blade portion length 46 inches, it is formed by nine forks. In the present embodiment, the Ti-base alloy described in the embodiment 1 is employed, in particular, it is preferable to employ the structure that the tensile strength in the dovetail portion is set to 110 kg/mm$^2$ and the tensile strength in the dovetail portion is set to 96% or more the tensile strength in the blade portion. Reference numeral 53 denotes a hole for inserting a pin, and reference numeral 54 denotes an erosion shield in which a Ti-base alloy containing 10 to 20% of V, 1.5 to 5% of Cr, 1.5 to 5% of Al and 1.5 to 5% of Sn or a stellite Co-base alloy containing 2 to 3% of C, 20 to 35% of Cr, 10 to 25% of W and 0 to 10% of Fe is brazed or electron beam welded, however, in this case, the former Ti-base alloy is employed. Reference numeral 57 denotes a continuous cover. Reference numeral 55 denotes a tie boss.

A description will be made of an embodiment of manufacturing a turbine blade in accordance with the present embodiment below.

At first, an ingot having the same composition as the alloy composition shown in the embodiment 1 is roughly forged to a circular rod material at about 850° C. in the $\alpha+\beta$ temperature range, and thereafter, a similar blade material of the blade portion and the dovetail portion is formed by a die forging at the same temperature. Both portions are made in a thickness about 1.3 times the final finishing size. Next, the material is held at 850° C. for an hour, and a whole is thrown into a water and a hardening is performed. After hardening, it is mechanically worked to a substantially final shape in accordance with an NC process, and next, the Ti-base alloy plate containing 15 weight % of V, 3 weight % of Cr, 3 weight % of Al, and 3 weight % of Sn is brazed in a leading edge portion of the blade portion front end. Next, in a state of fixing the blade portion to a jig having a predetermined profile shape and forcibly holding, it is heated at 500° C. for four hours commonly performing the aging treatment. The erosion shield 54 is obtained by hardening after previously heating at 800° C. four twenty minutes.

After the final heat treatment mentioned above, a blade profile having a final shape, a blade mounting portion and a pin inserting hole thereof are processed by a final machine process, thereby becoming a product. In accordance with the present embodiment, the tensile strength of the blade mounting portion is 98% or more than the blade portion, and he impact value is equal to each other.

The blade mounting portion 52 in accordance with the present invention is of the type comprising eight forks, and three pin inserting holes are provided in each of the forks. Further, the blade portion 51 as seen from a side surface in FIG. 8 is provided with a continuous cover 57 at the front end thereof in the same manner as FIG. 9, and is brought into contact with each other so as to be formed in a ring shape in all the periphery. Then, it is structured such as to be substantially in parallel to an axial direction of the rotor shaft in the mounting portion of the blade portion 51 and twisted so as to about 75.5 degrees cross to the axial direction at the front end. The continuous cover 57 has the same composition as that of the blade material, and has a thickness corresponding to the thickness of the ¼ t.

In this case, in the case of the structure for 3000 rpm, it is possible to manufacture the structure having the blade portion length 52 inches or more in the same manner as that of the present embodiment. A number of the forks of this blade is nine.

[Embodiment 3]

Figure 9:
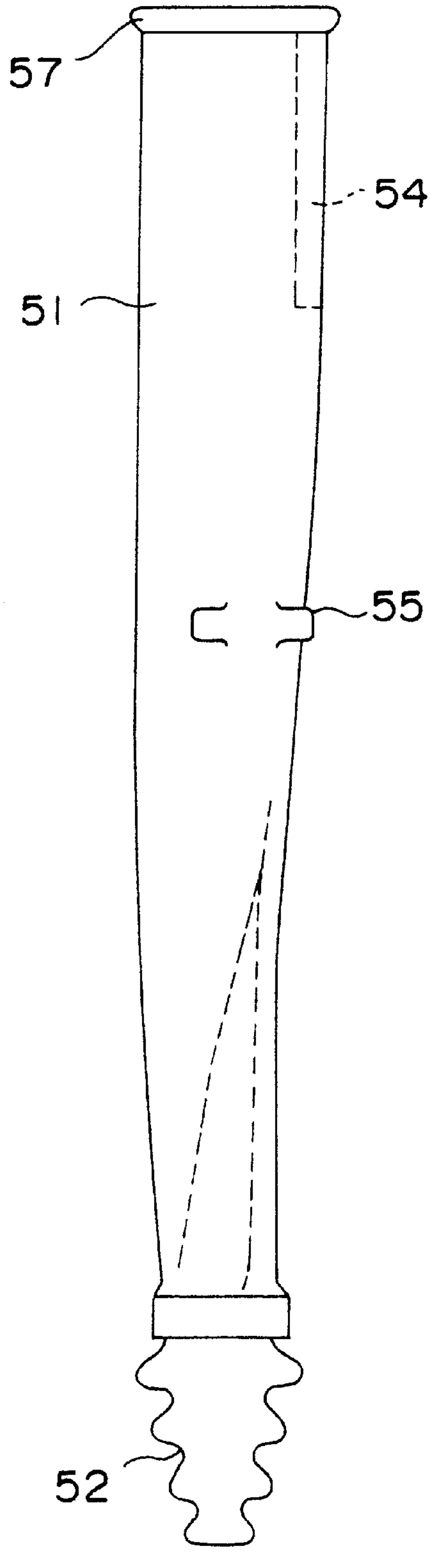
FIG. 9 is a side elevational view of a low pressure turbine blade.

FIG. 9 is a side elevational view of a structure in which the blade mounting portion is formed in an inverted Christmas tree shape in place of the fork shape. A steam turbine blade shown in this drawing has the same structure except the type of the blade mounting portion 52 in comparison with FIG. 8 mentioned above. Further, in the present embodiment, the Ti-base alloy in the embodiment 1 is employed. As shown in this drawing, the blade mounting portion 52 has four-stepped straight projections in both sides, and the blade portion by a high speed rotation is mounted and fixed to the rotor shaft by means of the projections. Then, a groove having the same space as the outer appearance of the rotor shaft is formed in the rotor shaft in such a manner as to be mounted along the axial direction of the rotor shaft. Further, the continuous cover 57 is provided in the front end portion of the blade portion 51, the blade portion of the mounting portion is formed substantially in parallel to the axial direction of the rotor shaft and the front end portion is formed in such a manner as to about 75.5 degrees cross to the axial direction as in the same manner as mentioned above.

Also in accordance with the present embodiment, it is possible to form the structure having the blade portion length of 43 inches, 46 inches and 48 inches with respect to the rotational speed 3600 rpm, and further it is possible to form the structure having the blade portion length of 52 inches with respect to the rotational speed 3000 rpm. The projection mentioned above is formed in four steps till 46 inches, however is formed in five steps with respect to a size of 48 inches or more.

Further, the Ti-base alloy plate or the Co-base alloy plate is employed in the erosion shield 54 as mentioned above, and the erosion shield 54 is bonded in the same manner.

[Embodiment 4]

Table 4 shows a main specification of a steam turbine having a steam temperature of 625° C. and 1050 MW in accordance with the present invention. The present embodiment is structured in a cross compound type 4 way exhaust and a blade portion length 43 inches at the final state rotor blade in the low pressure turbine, in which A is constituted by two machines comprising an HP-IP and two LP and B is constituted by an HP-LP and an IP-LP, both having the same rotational speed 3600 rpm, and the present embodiment is made of the main material shown in Table 4 at the high temperature portion. The high pressure portion (HP) has the steam temperature of 625° C. and the pressure of 250 kgf/cm$^2$, and the intermediate pressure portion (IP) has the steam temperature of 625° C., is heated by a reheater and is driven at the pressure of 45 to 65 kgf/cm$^2$. The low pressure portion (LP) enters at the steam temperature of 400° C. and is fed to a condenser at a temperature equal to or less than 100° C. and vacuum in 722 mmHg.

In accordance with the present embodiment, a total of a distance between the bearings connecting the high pressure turbine and the intermediate pressure turbine in a tandem manner with respect to the blade portion length of the final stage rotor blade in the low pressure turbine and a distance between the bearings of two low pressure turbines connected in a tandem manner is about 31.5 m, a ration thereof is 28.8 and the structure is made compact.

Further, in accordance with the present embodiment, a ratio between the distance between the bearings connecting the high pressure turbine and the intermediate pressure turbine in a tandem manner with respect to a rated output (MW) of the steam turbine power generating plant and the total distance (mm) of the distances between the bearings of two low pressure turbines connected in a tandem manner is 30.

high pressure steam turbine is provided with a high pressure axle (a high pressure rotor shaft) 23 mounting a high pressure rotor blade 16 within a high pressure internal chamber 18 and a high pressure external chamber 19 disposed outside the internal chamber 18. The high temperature and high pressure steam can be obtained by the boiler mentioned above, is fed to a main steam inlet 28 from a flange and an elbow 25 constituting the main steam inlet through the main steam pipe and guided to the rotor blade at the first stage dual current from a nozzle box 38. The first stage is structured in a dual current, and eight stages are provided at one side. The stator blades are respectively provided in correspondence to the rotor blades. The rotor blade is structured in a saddle type dovetail type, a double tenon and about 35 mm of the first stage blade length. A length between the axles is about 5.8 m, a diameter of the smallest portion among the portion corresponding to the stator blade portion is about 710 mm, and a ratio of the length with respect to the diameter is about 8.2.

TABLE 4

| | |
|---|---|
| TURBINE TYPE | CC4F-43 |
| ROTATIONAL FREQUENCY | 3600/3600 TIMES/MINUTE |
| STEAM CONDITION | 24.1 MPa - 625° C./625° C. |
| TURBINE STRUCTURE | |
| A | — |
| B | |
| HIGH PRESSURE FIRST STAGE BLADE STRUCTURE | COMPLICATED CURRENT TYPE 2 TENON SADDLE-SHAPED DOVETAIL BLADE |
| LOW PRESSURE FINAL STAGE BLADE | Ti-BASE ALLOY |
| MAIN STEAM STOP VALVE BODY STEAM CONTROL VALVE BODY | HIGH STRENGTH 12Cr FORGED STEEL |
| HIGH PRESSURE ROTOR | HIGH STRENGTH 12Cr FORGED STEEL |
| MIDDLE PRESSURE ROTOR | HIGH STRENGTH 12Cr FORGED STEEL |
| LOW PRESSURE ROTOR | 3.5Ni—Cr—Mo—V FORGED STEEL |
| HIGH TEMPERATURE PORTION ROTATIONAL BLADE | FIRST STAGE, HIGH STRENGTH 12Cr FORGED STEEL |
| HIGH PRESSURE WHEEL CHAMBER | |
| INNER PORTION | HIGH STRENGTH 9Cr FORGED STEEL |
| OUTER PORTION | HIGH STRENGTH Cr—Mo—V—B FORGED STEEL |
| MIDDLE PRESSURE WHEEL CHAMBER | |
| INNER PORTION | HIGH STRENGTH 9Cr FORGED STEEL |
| OUTER PORTION | HIGH STRENGTH Cr—Mo—V—B FORGED STEEL |
| THERMAL EFFICIENCY (AT RATED OUTPUT AND POWER GENERATING END) | 47.5% |

A

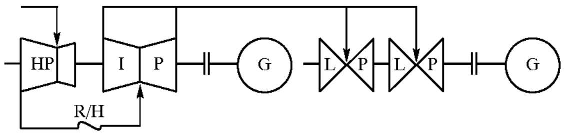

B

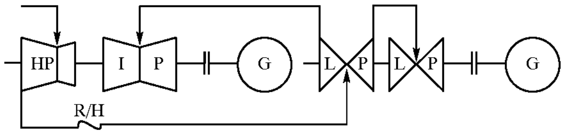

CC4F-43: CROSS COMPOUND TYPE 4 WAY EXHAUST, USE 43 INCHES LONG BLADE
HP: HIGH PRESSURE PORTION
IP: MIDDLE PRESSURE PORTION
LP: LOW PRESSURE PORTION
R/H: REHEATER (BOILER)

Figure 10:
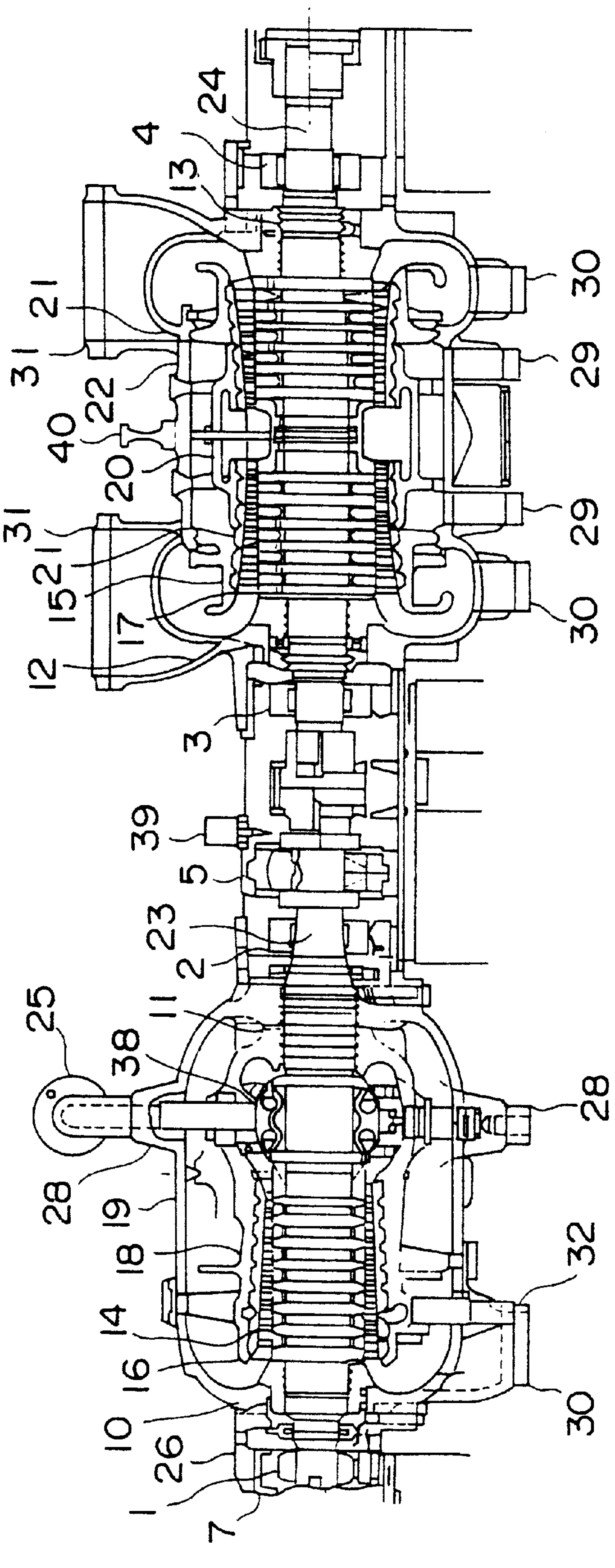
FIG. 10 is a cross sectional view showing a state in which a high pressure turbine and an intermediate pressure turbine are connected.

FIG. 10 is a schematic view of a cross sectional structure of the high pressure and intermediate pressure steam turbine in the item A of the turbine structure shown in Table 4. The In accordance with the present embodiment, a material shown in Table 7 mentioned below is used for the first stage blade and the first stage nozzle, and the other blades and nozzles are made of the 12% Cr-base steel containing no W, Co and B. A length of the blade portion of the rotor blade in accordance with the present embodiment is 35 to 50 mm at the first stage, is longer at each of the stages from the second stage to the final stage, and in particular, 65 to 180 mm from the second stage to the final stage due to the output of the steam turbine, a number of the stages is nine to twelve, and a length of the blade portion in each of the stages is increased at a rate of 1.10 to 1.15 in a manner such that the length in the downstream side is longer than that of the adjacent upstream side. Further, the rate is gradually increased in the downstream side.

The high pressure turbine in accordance with the present embodiment is structured such that the distance between the bearings is about 5.3 mm, and a ratio of the distance between the bearings with respect to the blade portion length of the final stage rotor blade in the low pressure turbine is 4.8. Further, a ratio of the distance (mm) between the bearings of the high pressure turbine with respect to the rated output (MW) of the power generating plant is 5.0.

The intermediate pressure steam turbine is structured such as to rotate the power generating machine together with the high pressure steam turbine by the steam obtained by again heating the steam discharged from the high pressure steam turbine to a temperature of 625° C. by using the reheater, and is rotated at a rotational speed of 3600 times per minute. The intermediate pressure turbine has an intermediate pressure internal second chamber 21 and an intermediate pressure external chamber 22 in the same manner as the high pressure turbine, and a stator blade is provided in opposite to the intermediate pressure rotor blade 17. The rotor blade 17 is structured at six stages and in two ways, and is provided in right and left portions in a substantially symmetrical manner with respect to the longitudinal direction of the intermediate pressure axle (the intermediate pressure rotor shaft). The distance between the centers of the bearings is about 5.8 m, the first stage blade length is about 100 mm, and the final stage blade length is about 230 mm. The dovetails at the first and second stages are formed in an inverted Christmas tree type. A diameter of the rotor shaft in correspondence to the stator blade prior to the final stage rotor blade is about 630 mm, and a ratio of the distance between the bearings with respect to the diameter is about 9.2 times.

The rotor shaft of the intermediate pressure steam turbine in accordance with the present embodiment is structured such that a width in an axial direction of the rotor blade mounting portion is increased at three steps from the first stage to the four stage, five stage and the final stage step by step, and the width at the final stage is 1.4 times greater than that of the first stage.

Further, the rotor shaft of this steam turbine is structured such that the diameter of the portion corresponding to the stator blade portion is reduced, the width thereof is reduced at four steps from the first stage rotor blade to the second and third stage rotor blades and the final stage rotor blade, and the width in the axial direction of the latter with respect to the former is reduced to about 0.75 times.

In accordance with the present embodiment, the 12% Cr-base steel containing no W, Co and B is used except that the material shown in Table 7 mentioned below is used for the first stage blade and nozzle. The length of the blade portion of the rotor blade in accordance with the present embodiment is increased at each of the stages from the first stage to the final stage, the length from the first stage to the final stage is 60 to 300 mm in accordance with the output of the steam turbine, and at the sixth to ninth stages, the length of the blade portion of each of the stages is increased at a rate of 1.1 to 1.2 between the adjacent lengths in the downstream side with respect to the upstream side.

The mounting portion of the rotor blade is structured such that the diameter thereof is larger than that of the portion corresponding to the stator blade, and the width thereof is set such that the mounting width is increased in accordance with the increase of the length of the blade portion of the rotor blade. The rate of the width thereof with respect to the length of the blade portion of the rotor blade is 0.35 to 0.8 from the first stage to the final stage, and is reduced from the first stage to the final stage step by step.

The intermediate pressure turbine in accordance with the present embodiment is structured such that the distance between the bearings is about 5.5 m, the rate of the distance between the bearings of the intermediate pressure turbine with respect to the length of the blade portion of the final stage rotor blade of the low pressure turbine is 5.0, and the rate of the distance (mm) between the bearings with respect to the rated output (MW) of the power generating plant is 5.2.

The turbine blade mounted to the first stage of the high pressure turbine is a saddle type mounting type, and the turbine blades mounted to the second stage and thereafter of the high pressure turbine and all the stages of the intermediate pressure turbine are formed in an inverted Christmas tree shape.

Figure 11:
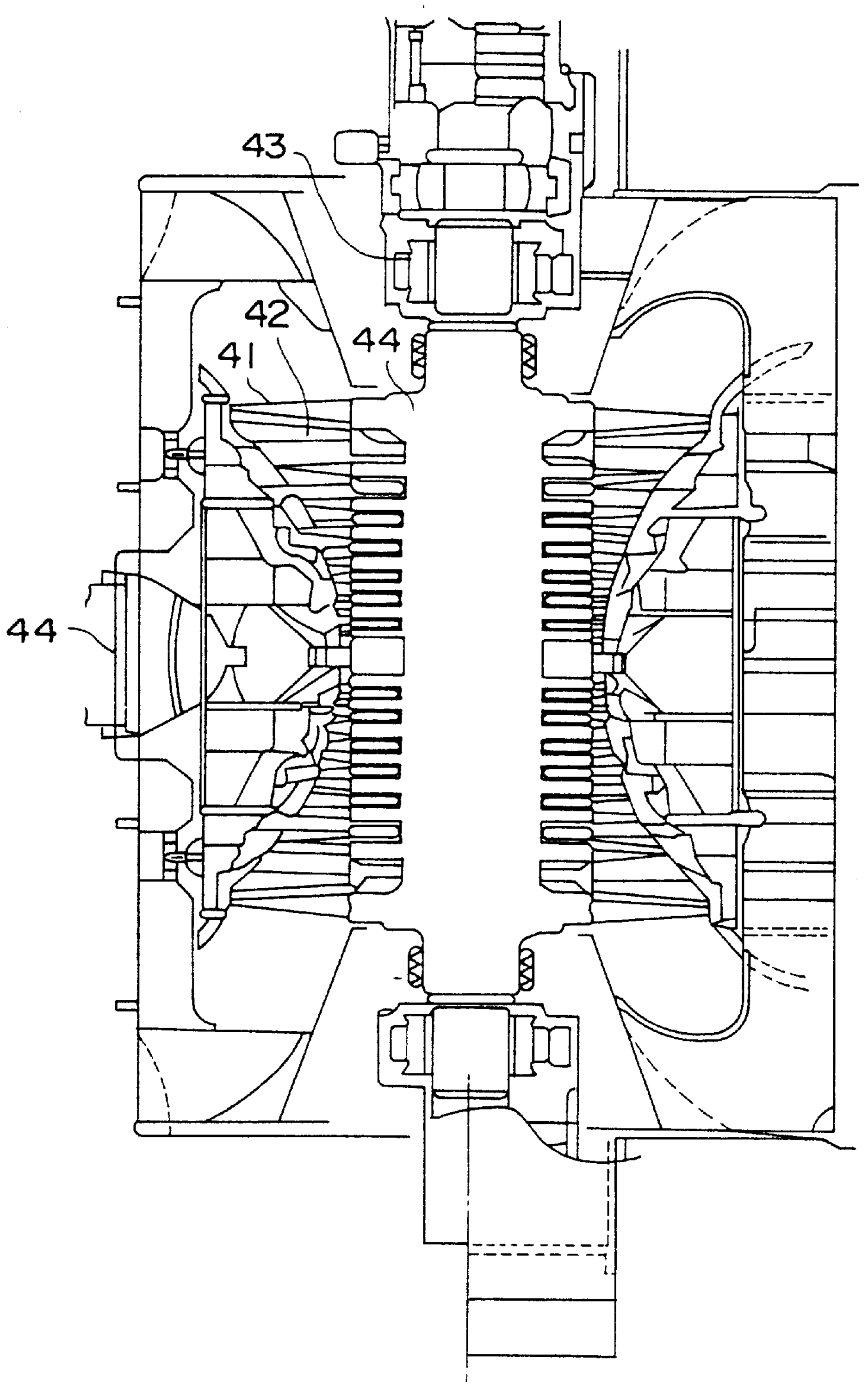
FIG. 11 is a cross sectional view of a low pressure steam turbine.

FIG. 11 is a cross sectional view of a low pressure turbine having a rotational speed of 3600 rpm. Two low pressure turbines are connected in a tandem manner, and have substantially the same structure. Eight stages of rotor blades 41 are provided in each of right and left portions, they are provided in the right and left portions substantially in a symmetrical manner, and the stator blade 42 is provided in correspondence to the rotor blade. The steam turbine blade made of the Ti-base alloy, formed in a double tenon and having the blade portion length of 43 inches as shown in the embodiment 2 or 3 is employed for the final stage rotor blade. The nozzle box 45 is a dual current type.

A forged steel of a super-cleaned fully tempered bainite steel shown in Table 5 is used for the rotor shaft 44. With respect to the steel shown in Table 5, various kinds of characteristics are searched by using a steel lump of 5 kg. These steels are obtained by heating at 840° C. for three hours after a hot forging, hardening by cooling at 100° C./h and thereafter tempering by heating at 575° C. for 32 hours. Table 6 shows a characteristic at a room temperature.

TABLE 5

| No. | C | Si | Mn | P | S | Ni | Cr | Mo | V | Sn | Al | As | Sb | ETC. |
|---|---|---|---|---|---|---|---|---|---|---|---|---|---|---|
| 1 | 0.25 | 0.04 | 0.16 | 0.013 | 0.004 | 3.77 | 2.08 | 0.43 | 0.13 | 0.005 | 0.009 | 0.004 | <0.0005 | |
| 2 | 0.27 | 0.04 | 0.15 | 0.012 | 0.004 | 3.35 | 1.97 | 0.43 | 0.12 | 0.004 | 0.002 | 0.003 | " | |
| 3 | 0.26 | 0.04 | 0.15 | 0.011 | 0.011 | 4.15 | 1.95 | 0.45 | 0.14 | 0.005 | 0.005 | 0.004 | " | |
| 4 | 0.26 | 0.05 | 0.15 | 0.011 | 0.011 | 3.78 | 2.35 | 0.43 | 0.13 | 0.005 | 0.007 | 0.004 | " | |

TABLE 5-continued

| No. | C | Si | Mn | P | S | Ni | Cr | Mo | V | Sn | Al | As | Sb | ETC. |
|---|---|---|---|---|---|---|---|---|---|---|---|---|---|---|
| 5 | 0.23 | 0.04 | 0.15 | 0.010 | 0.010 | 3.75 | 1.98 | 0.42 | 0.13 | 0.004 | 0.008 | 0.003 | " | Nb 0.02 |
| 6 | 0.25 | 0.05 | 0.10 | 0.010 | 0.011 | 3.75 | 1.75 | 0.40 | 0.15 | 0.005 | 0.007 | 0.004 | " | |

TABLE 6

| No. | 0.02% PROOF STRESS ($kg/mm^2$) | 0.2% PROOF STRESS ($kg/mm^2$) | TENSILE STRENGTH ($kg/mm^2$) | ELONGATION RATE (%) | DRAWING RATE (%) | IMPACT VALUE (%) | FATT (° C.) |
|---|---|---|---|---|---|---|---|
| 1 | 82.6 | 93.6 | 106.6 | 19.8 | 66.1 | 13.8 | −27 |
| 2 | 82.5 | 93.2 | 107.2 | 20.1 | 64.2 | 15.5 | −23 |
| 3 | 83.4 | 93.9 | 106.8 | 19.2 | 63.9 | 12.3 | −59 |
| 4 | 79.9 | 89.3 | 102.8 | 19.7 | 61.9 | 11.2 | −39 |
| 5 | 84.2 | 95.4 | 107.9 | 18.9 | 64.2 | 10.6 | −55 |
| 6 | 83.9 | 94.8 | 107.6 | 19.5 | 64.0 | 14.5 | −20 |

All the samples have a fully tempered bainite structure. They have a high strength and a high toughness, that is, 80 $kg/mm^2$ or more of 0.02% proof stress, 87.5 $kg/mm^2$ or more of 0.2% proof stress, 100 $kg/mm^2$ or more of tensile stress, 10 kg−m or more of V notch impact value and −20° C. or less of FATT, so that they satisfy a mounting of the 46 inch structure as well as the structure having the blade length 43 inches or more for the final stage rotor blade in accordance with the present embodiment. No. 4 having a little large amount of Cr has a low strength, and the amount of Cr is preferably set to about 2.20% or less. In particular, the 0.2% proof stress (y) is preferably set to a value equal to or more than a value obtained by a formula (1.35x−20.5) with using the 0.02% proof stress (x), more preferably a value obtained by a formula (1.35x−19).

12% Cr steel containing 0.1% Mo is used for all of the rotor blades and the stator blades in the stages other than the final stage. A cast steel containing 0.25% C is used for the internal and external casing members. A distance between the centers in the bearing 43 in accordance with the present embodiment is 7500 mm, a diameter of the rotor shaft corresponding to the stator blade portion is about 1280 mm, and a diameter in the rotor blade mounting portion is 2275 mm. A distance between the centers of the bearings with respect to the diameter of the rotor shaft is about 5.9.

The continuous cover 57 is formed by a cutting process after integrally forging the whole in accordance with the present invention. In this case, the continuous cover 57 may be mechanically formed as a unit.

The low pressure turbine in accordance with the present invention is structured such that a width in an axial direction of the rotor blade mounting portion is gradually increased by four steps comprising the first to third stages, the fourth stage, the fifth stage, the sixth to seventh stages and the eighth stage, and the width of the final stage is 2.5 times larger than the width of the first stage.

Further, the diameter of the portion corresponding to the stator blade portion is reduced, the width in the axial direction of the portion is gradually increased by three steps comprising the fifth stage, the sixth stage and the seventh stage from the first stage rotor blade side, and the width of the final stage side is 1.9 times larger than that between the first stage and the second stage.

The rotor blade in accordance with the present invention is constituted by eight stages, the length of the blade portion is increased at each of the stages from about 3 inches at the first stage to 43 inches at the final stage, the length of the stages from the first stage to the final stage is increased from 90 to 270 mm and at eight stages or nine stages in accordance with the output of the steam turbine, and the length of the blade portion in each of the stages is increased at a rate of 1.3 to 1.6 times with respect to the adjacent length in the downstream side against the upstream side.

The mounting portion of the rotor blade is structured such that a diameter is greater than the portion corresponding to the stator blade and the mounting width is increased in accordance with an increase of the blade portion length of the rotor blade. The rate of the width with respect to the length of the blade portion in the rotor blade is 0.15 to 0.19 from the first stage to the final stage, and is reduced step by step from the first stage to the final stage.

Further, the width of the rotor shaft in the portion corresponding to each of the stator blades is increased step by step at each of the stages from the portion between the first stage and the second stage to the portion between the final stage and the preceding stage. The rate of the width with respect to the length of the blade portion in the rotor blade is 0.25 to 1.25 and is reduced from the upstream side to the downstream side.

The low pressure turbine in accordance with the present invention is structured such that two turbines are connected in a tandem manner, the total distance between the bearings is about 18.3 m, the ratio of the total distance between the bearings of two low pressure turbines connected in a tandem manner with respect to the length of the blade portion of the final stage rotor blade in the low pressure turbine is 16.7, and the rate of the total distance (mm) between the bearings at both ends of two low pressure turbines connected in a tandem manner with respect to the rated output 1050 (MW) of the power generating plant is 17.4.

In addition to the present embodiment, the same structure can be employed to the 1000 MW class large capacity power generating plant having the steam inlet temperature to the high pressure steam turbine and the intermediate pressure steam turbine 610° C. and the steam inlet temperature to two low pressure steam turbines 385° C.

The high temperature and high pressure steam turbine plant in accordance with the present embodiment is mainly constituted by a boiler exclusively burning a coal, a high pressure turbine, an intermediate pressure turbine, two low pressure turbines, a condenser, a condensing pump, a low pressure water supply heater system, a deaerator, a pressure increasing pump, a water supply pump, a high pressure water supply heater system and the like. That is, a ultra high temperature and high pressure steam generated in the boiler enters into the high pressure turbine so as to generate a power, and thereafter is again reheated by the boiler and enters into the intermediate pressure turbine so as to generate the power. The intermediate pressure turbine discharged steam is condensed in the condenser after entering into the low pressure turbine so as to generate the power. The condensed fluid is fed to the low pressure water supply heater system and the deaerator by the condensing pump. The supplied water deaerated in the deaerator is fed to the high pressure water supply heater by the water supply pump and heated, and thereafter returned to the boiler.

Here, in the boiler, the supplied water becomes a steam having a high temperature and a high pressure with passing through a fuel economizer, an evaporator and a super heater. Further, on the contrary, the boiler combustion gas heating the steam comes out from the fuel economizer, and thereafter enters into an air heater so as to heat the air. In this case, a water supply pump driving turbine driven by an extracted steam from the intermediate pressure turbine is employed for driving the water supply pump.

In the high temperature and high pressure steam turbine plant structured in the manner mentioned above, since the temperature of the supplied water coming out from the high pressure water supply heater system becomes significantly higher than the temperature of the supplied water in the conventional thermal electric power plant, the temperature of the combustion gas coming out from the fuel economizer within the boiler necessarily higher than that of the conventional boiler in a significant level. Accordingly, it is intended to recover a heat from the boiler discharged gas so as to prevent the gas temperature from lowering.

Further, in place of the present embodiment, the same structure can be applied to a tandem compound type power generating plant in which one low pressure turbine is connected to each of the high pressure turbine and the intermediate pressure turbine in a tandem manner and one power generator is connected to each of them so as to generate a power in the power generator of an output 1050 MW class in accordance with the present embodiment, a stronger structure is employed for a shaft of the power generator. In particular, a material having a fully tempered bainite structure containing 0.15 to 0.30% of C, 0.1 to 0.3% of Si, 0.5% or less of Mn, 3.25 to 4.5% of Ni, 2.05 to 3.0% of Cr, 0.25 to 0.60% of Mo and 0.05 to 0.20% of V, having a tensile strength at room temperature of 93 $kgf/mm^2$ or more, particularly 100 $kgf/mm^2$ or more, and having a 50% FATT of 0° C. or less, particularly −20° C. or less is preferable, and further a material having a magnetization force at 21.2 KG of 985 AT/cm or less, a total amount of D, S, Sn, Sb and As as impurity of 0.025% or less and a Ni/Cr ratio of 2.0 or less is preferable.

The high pressure turbine shaft is structured such that nine stages of blades are mounted thereon around the first stage blade mounting portion in a multiple stage side. The intermediate pressure turbine shaft is structured such that the blade mounting portion is provided so that the multiple stage blades are arranged at six stages in the right and left portions substantially in a symmetrical manner substantially on the boundary of the center thereof. The rotor shaft for the low pressure turbine is not illustrated, however, a central hole is provided in the rotor shaft of all of the high pressure, intermediate pressure and low pressure turbines, and it is inspected by an ultrasonic inspection, a visual inspection and a fluorescent penetrant inspection through the central hole whether or not a defect exists. Further, the inspection can be performed by an ultrasonic inspection from an outer surface, and the central hole may be cancelled.

Table 7 shows a chemical composition (a weight %) of the material used for the main portion of the high pressure turbine, the intermediate pressure turbine and the low pressure turbine in accordance with the power generating plant of the present embodiment. In accordance with the present embodiment, since all of the high temperature portion of the high pressure portion and the intermediate pressure portion is made of the material having a ferrite crystal structure and a coefficient of thermal expansion of about 12×10−6/° C., there is no problem caused by a difference of a coefficient of thermal expansion.

The rotor shaft of the high pressure turbine and the intermediate pressure turbine is formed by dissolving 30 tons of a heat resisting cast steel described in Table 7 (weight %) in an electric furnace, vacuum deoxidizing a carbon, casting to a metal casting mold, forging so as to manufacture an electrode rod, again dissolving an electronic slug so as to dissolve the electrode rod from an upper portion of the cast steel to a lower portion thereof, and forging in a rotor shape (diameter 1050 mm and length 3700 mm). The forging is performed at a temperature equal to or less than 1150° C. in order to prevent a forging crack. Further, it is obtained by annealing the forged steel, thereafter heating to 1050° C., hardening by spraying a water, tempering at 570° C. and 690° C. for two times and cutting to a final shape. In accordance with the present embodiment, the upper portion side of the lump of the electronic slug steel is set in the first stage blade side and the lower portion thereof is set in the final stage side. All of the rotor shafts have the central hole, however, the central hole can be cancelled by lowering the impurity.

The blade and the nozzle in the high pressure portion and the low pressure portion is formed by dissolving the heat resisting steel described in Table 7 by the vacuum arc dissolving furnace and forging to the shape of the blade and the nozzle (width 150 mm, height 50 mm and length 1000 mm). The forging is performed at a temperature equal to or lower than 1150° C. for preventing the forging crack. Further, it is obtained by heating the forged steel to 1050° C., performing an oil hardening treatment and a tempering treatment at 690° C. and next cutting to a predetermined shape.

The internal casing of the high pressure portion and the intermediate pressure portion, a main steam stopper valve casing and a steam adjusting valve casing are manufactured by dissolving the heat resisting cast steel described in Table 7 in the electric furnace, refining in a ladle and thereafter casting to a sand mold casting die. A product with no casting defect such as a shrinkage cavity and the like can be obtained by performing a sufficient refining and deoxidization prior to casting. An estimation of a welding capability with using the casing material is performed in accordance with JIS Z3158. A temperature for a preheating, during a pass and for starting a post-heating is set to 200° C. and a temperature for a post-heating is set to 400° C. for thirty minutes. No welding crack is recognized in the material of the present invention, and a welding capability is good.

TABLE 7

| NAME OF MAIN PARTS | | C | Si | Mn | Ni | Cr | Mo | W | V | Nb | N | Co | O | OTHERS | AMOUNT OF Cr | NOTE |
|---|---|---|---|---|---|---|---|---|---|---|---|---|---|---|---|---|
| HIGH PRESSURE PORTION MIDDLE PRESSURE PORTION | ROTOR SHAFT | 0.11 | 0.03 | 0.52 | 0.49 | 10.98 | 0.19 | 2.60 | 0.21 | 0.07 | 0.019 | 2.70 | 0.015 | — | 5.11 (≦9.5) | NORMAL CONDITION |
| | BLADE (FIRST STAGE) | 0.10 | 0.04 | 0.42 | 0.51 | 11.01 | 0.15 | 2.62 | 0.19 | 0.08 | 0.020 | 2.81 | 0.018 | — | 5.07 (≦10) | NORMAL CONDITION |
| | NOZZLE (FIRST STAGE) | 0.09 | 0.04 | 0.55 | 0.59 | 10.50 | 0.14 | 2.54 | 0.18 | 0.06 | 0.015 | 2.67 | 0.013 | — | 4.54 (≦10) | NORMAL CONDITION |
| | INTERNAL CASING | 0.12 | 0.19 | 0.50 | 0.88 | 8.95 | 0.80 | 1.68 | 0.18 | 0.06 | 0.040 | — | 0.002 | — | 7.57 | NORMAL CONDITION |
| HIGH, MIDDLE PRESSURE PORTION | EXTERNAL CASING | 0.12 | 0.21 | 0.32 | 0.08 | 1.51 | 1.22 | — | 0.72 | — | — | — | 0.0007 | Ti 0.05 Al 0.010 | — | NORMAL CONDITION |
| | INNER CASING FASTENING BOLT | 0.11 | 0.10 | 0.50 | 0.60 | 10.82 | 0.23 | 2.80 | 0.23 | 0.08 | 0.021 | 3.00 | 0.020 | — | 4.72 | NORMAL CONDITION |
| LOW PRESSURE PORTION | ROTOR SHAFT | 0.25 | 0.03 | 0.04 | 3.88 | 1.75 | 0.36 | — | 0.13 | — | — | — | — | — | — | NORMAL CONDITION |
| | BLADE (EXCEPT FINAL STAGE) | 0.11 | 0.20 | 0.53 | 0.39 | 12.07 | 0.07 | — | — | — | — | — | — | — | — | NORMAL CONDITION |
| | NOZZLE | 0.12 | 4.18 | 0.50 | 0.43 | 12.13 | 0.10 | — | — | — | — | — | — | — | — | NORMAL CONDITION |
| | INTERNAL CASING | 0.25 | 4.51 | — | — | — | — | — | — | — | — | — | — | — | — | NORMAL CONDITION |
| | EXTERNAL CASING | 0.24 | 4.50 | — | — | — | — | — | — | — | — | — | — | — | — | NORMAL CONDITION |
| MAIN STEAM STOPPER VALVE CASING | | 0.10 | 0.19 | 0.48 | 0.85 | 8.96 | 0.60 | 1.62 | 0.20 | 0.05 | 0.042 | — | 0.002 | — | 8.56 | NORMAL CONDITION |
| STEAM CONTROL VALVE CASING | | 0.12 | 0.21 | 0.52 | 0.83 | 9.00 | 0.83 | 1.70 | 0.17 | 0.08 | 0.039 | — | 0.001 | — | 7.97 | NORMAL CONDITION |

Table 8 shows a mechanical nature and a heat treatment condition for cutting and searching the main members of the high temperature steam turbine made of the ferrite steel mentioned above.

As a result of searching the center portion of the rotor shaft, it is recognized that characteristics (625° C., $10^5$ h strength≧10 kgf/mm$^2$, 20° C. impact absorbing energy≧1.5 kgf−m) required for the high pressure and intermediate pressure turbine rotors are sufficiently satisfied. Accordingly, it is proved that the steam turbine rotor usable in the steam at a temperature equal to or more than 620° C. can be manufactured.

Further, as a result of searching the characteristic of the blade, it is recognized that characteristics (625° C., $10^5$ h strength≧15 kgf/mm$^2$) required for the first stage blade of the high pressure and intermediate pressure turbines are sufficiently satisfied. Accordingly, it is proved that the steam turbine blade usable in the steam at a temperature equal to or more than 620° C. can be manufactured.

Still further, as a result of searching the characteristic of the casing, it is recognized that characteristics (625° C., $10^5$ h strength≧10 kgf/mm$^2$, 20° C. impact absorbing energy≧1 kgf−m) required for the high pressure and intermediate pressure turbine casings are sufficiently satisfied and a welding can be performed. Accordingly, it is proved that the steam turbine casing usable in the steam at a temperature equal to or more than

TABLE 8

| NAME OF MAIN PARTS | | TENSILE STRENGTH (kgt/mm$^2$) | 0.2% PROOF STRESS (kgt/mm$^2$) | ELONGATION RATE (%) | DRAWING RATE (%) | IMPACT VALUE (kgt-m) | FATT (%) | $10^5$ H CREEP BREAKAGE STRENGTH 625° C. | 575° C. | 450° C. | THERMAL TREATMENT CONDITION |
|---|---|---|---|---|---|---|---|---|---|---|---|
| HIGH PRESSURE | ROTOR SHAFT | 90.5 | 76.6 | 20.6 | 66.8 | 3.8 | 40 | 17.0 | — | — | 1050° C. × 15 H WATER INJECTION COOLING, 570° C. × 20 H FURNACE COOLING, |

TABLE 8-continued

| NAME OF MAIN PARTS | | TENSILE STRENGTH (kgt/mm²) | 0.2% PROOF STRESS (kgt/mm²) | ELONGATION RATE (%) | DRAWING RATE (%) | IMPACT VALUE (kgt-m) | FATT (%) | $10^5$ H CREEP BREAKAGE STRENGTH 625° C. | 575° C. | 450° C. | THERMAL TREATMENT CONDITION |
|---|---|---|---|---|---|---|---|---|---|---|---|
| PORTION AND MIDDLE PRESSURE PORTION | | | | | | | | | | | 690° C. × 20 H FURNACE COOLING |
| | BLADE (FIRST STAGE) | 93.4 | 81.5 | 20.9 | 69.8 | 4.1 | — | 18.1 | — | — | 1075° C. × 1.5 H OIL COOLING, 740° C. × 5 H AIR COOLING |
| | NOZZLE (FIRST STAGE) | 93.0 | 80.9 | 21.4 | 70.3 | 4.8 | — | 17.8 | — | — | 1050° C. × 1.5 H OIL COOLING, 690° C. × 5 H AIR COOLING |
| | INTERNAL CASING | 79.7 | 80.9 | 19.8 | 65.3 | 5.3 | — | 11.2 | — | — | 1050° C. × 8 H IMPACT AIR COOLING, 600° C. × 20 H FURNACE COOLING, 730° C. × 10 H FURNACE COOLING |
| | EXTERNAL CASING | 89.0 | 53.8 | 21.4 | 65.4 | 1.5 | — | — | 12.5 | — | 1050° C. × 8 H IMPACT AIR COOLING, 725° C. × 10 H FURNACE COOLING |
| | INTERNAL CASING BOLT | 107.1 | 91.0 | 19.5 | 88.7 | 2.0 | — | 18.0 | — | — | 1075° C. × 2 H OIL COOLING, 740° C. × 5 H AIR COOLING |
| LOW PRESSURE PORTION | ROTOR SHAFT | 91.8 | 80.0 | 22.0 | 76.1 | 78.1 | −50 | — | — | 36 | 950° C. × 30 H WATER INJECTION COOLING, 605° C. × 45 H FURNACE COOLING |
| | BLADE (EXCEPT FINAL STAGE) | 36.0 | 88.0 | 22.1 | 57.5 | 5.5 | — | — | — | 27 | 950° C. × 1.5 H OIL COOLING, 650° C. × 5 H AIR COOLING |
| | NOZZLE | 78.8 | 85.7 | 22.4 | 69.6 | 3.8 | — | — | — | 26 | 950° C. × 1.5 H OIL COOLING, 650° C. × 5 H AIR COOLING |
| | INTERNAL CASING | 41.5 | 27.2 | 22.7 | 81.0 | — | — | — | — | — | — |
| | EXTERNAL CASING | 41.1 | 20.3 | 24.5 | 80.5 | — | — | — | — | — | — |
| MAIN STEAM STOPPER VALVE CASING | | 77.0 | 81.6 | 18.8 | 65.0 | 2.5 | — | 11.7 | — | — | 1050° C. × 8 H IMPACT AIR COOLING, 800° C. × 20 H FURNACE COOLING, 730° C. × 10 H FURNACE COOLING |
| STEAM CONTROL VALVE CASING | | 71.5 | 61.8 | 18.2 | 84.8 | 2.4 | — | 11.0 | — | — | 1050° C. × 8 H IMPACT AIR COOLING, 600° C. × 20 H FURNACE COOLING, 730° C. × 10 H FURNACE COOLING |

620° C. can be manufactured.

In the present embodiment, Cr—Mo low alloy steel is build up welded on a journal portion of the high pressure and intermediate pressure rotor shafts, thereby improving a characteristic of the bearing. The build up welding is performed in the following manner.

A coated electrode (diameter 4.0 ϕ) is employed for a welding rod to be tested. A chemical composition (weight %) of a weld metal in the case of welding by using the welding rod is shown in Table 9. The composition of the weld metal is substantially the same as the composition of the weld material. A welding condition is that a welding current is 170 A, a voltage is 24 V and a speed is 26 cm/min.

TABLE 9

| No. | C | Si | Mn | P | S | Ni | Cr | Mo | Fe |
|---|---|---|---|---|---|---|---|---|---|
| A | 0.06 | 0.45 | 0.65 | 0.010 | 0.011 | — | 7.80 | 0.50 | REMAINDER |

TABLE 9-continued

| No. | C | Si | Mn | P | S | Ni | Cr | Mo | Fe |
|---|---|---|---|---|---|---|---|---|---|
| B | 0.03 | 0.65 | 0.70 | 0.009 | 0.008 | — | 5.13 | 0.53 | REMAINDER |
| C | 0.03 | 0.79 | 0.56 | 0.009 | 0.012 | 0.01 | 2.34 | 1.04 | REMAINDER |
| D | 0.03 | 0.70 | 0.90 | 0.007 | 0.016 | 0.03 | 1.30 | 0.57 | REMAINDER |

An eight layers of build up welding is performed on a surface of a base metal to be tested mentioned above by combining the used welding rods at every layers as shown in Table 10. A thickness of each of the layers is 3 to 4 mm, a total thickness is about 28 mm and the surface is about 5 mm cut.

A condition for welding is that a temperature or preheating, during a pass and for starting a stress relieving (SR) is 250 to 350° C. and a condition for the SR treatment is keeping the temperature 630° C. for 36 hours.

TABLE 10

| FIRST LAYER | SECOND LAYER | THIRD LAYER | FOURTH LAYER | FIFTH LAYER | SIXTH LAYER | SEVENTH LAYER | EIGHTH LAYER |
|---|---|---|---|---|---|---|---|
| A | B | C | D | D | D | D | D |

In order to confirm a performance of the welded portion, a build up welding is applied to a plate material and a side bending test at 160 degrees is performed, however, no crack is recognized in the welded portion.

Further, a bearing slide test in accordance with a rotation in the present invention is performed, however, in all of them, the bearing is not badly influenced and an excellent anti oxidation can be obtained.

In place of the present embodiment, in a tandem type power generating plant structured such that the high pressure steam turbine, the intermediate pressure steam turbine and one or two low pressure steam turbine are connected in a tandem manner and a rotation is performed at 3600 numbers, and a turbine structure B shown in Table 4, the structure can be made by the same combination of the high pressure turbine, the intermediate pressure turbine and the low pressure turbine in accordance with the present embodiment.

[Embodiment 4]

Table 11 shows a main specification of a steam turbine having a main steam temperature of 538° C./566° C. and a rated output of 700 MW. The present embodiment is of a tandem compound double flow type, has a final stage blade length of 46 inches in the low pressure turbine, is formed as HP (high pressure) and IP (intermediate pressure) integral type or one LP (C) or two LP (D), has a rotational speed of 3600 rpm, and is made of the main material shown in the table at the high temperature portion. The steam at the high pressure portion (HP) has a temperature of 538° C. and a pressure of 246 $kgf/cm^2$, the temperature of the steam at the intermediate pressure portion (IP) is heated by the reheater, and an operation is performed by the pressure of 45 to 65 $kgf/cm^2$. The low pressure portion (LP) enters at a temperature of the steam of 400° C., and is fed to the condenser at a temperature of 100° C. or less and a vacuum of 722 mmHg.

The steam turbine power generating plant provided with a high and intermediate pressure integral turbine structured such that the high pressure turbine and the intermediate pressure turbine are integrally formed, and two low pressure turbines in a tandem manner in accordance with the present embodiment is structured such that a distance between the bearings is about 22.7 m, and a ratio of a total distance comprising a distance between the bearings of the high and intermediate pressure integral turbine and a distance between the bearings of two low pressure turbines connected in a tandem manner with respect to the length (1168 mm) of the blade portion of the final stage rotor blade in the low pressure turbine is 19.4.

Further, the steam turbine power generating plant provided with the high and intermediate pressure integral turbine integrally formed by the high pressure turbine and the intermediate pressure turbine and one low pressure turbine in accordance with the present embodiment is structured such that a distance between the bearings is about 14.7 m, and a ratio of a total distance comprising a distance between the bearings of the high and intermediate pressure integral turbine and a distance between the bearings of one low pressure turbine with respect to the length (1168 mm) of the blade portion of the final stage rotor blade in the low pressure turbine is 12.6. Further, a ratio of a total distance comprising a distance between the bearings of the high and intermediate pressure integral turbine and a distance between the bearings of one low pressure turbine with respect to 1 MW in the rated output 700 MW of the power generating plant is 21.0.

TABLE 11

| | |
|---|---|
| TURBINE TYPE | TCDF-46 |
| ROTATIONAL FREQUENCY | 3600/3600 TIMES/MINUTE |
| STEAM CONDITION | 24.6 MPa - 538° C./566° C. |
| TURBINE STRUCTURE | |
| A | 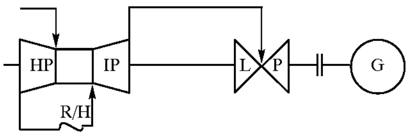 |
| B | 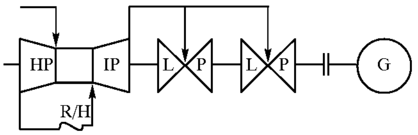 |
| HIGH PRESSURE FIRST STAGE BLADE STRUCTURE | 2 TENON SADDLE TYPE DOVETAIL BLADE |
| LOW PRESSURE FINAL STAGE BLADE | Ti-BASE ALLOY 46 INCHES LONG BLADE |
| MAIN STEAM STOPPER VALVE BODY | HIGH STRENGTH 12Cr FORGED STEEL |
| STEAM CONTROL VALVE BODY | |
| HIGH–MIDDLE PRESSURE ROTOR | HIGH STRENGTH 12Cr FORGED STEEL |
| LOW PRESSURE ROTOR | 3.5Ni—Cr—Mo—V FORGED STEEL |

TABLE 11-continued

| | |
|---|---|
| HIGH TEMPERATURE PORTION ROTARY BLADE | FIRST STAGE, HIGH STRENGTH 12Cr FORGED STEEL |
| HIGH–MIDDLE PRESSURE CHAMBER | |
| INTERNAL PORTION | HIGH STRENGTH 9Cr CAST STEEL |
| EXTERNAL PORTION | HIGH STRENGTH Cr—Mo—V—B CAST STEEL |
| THERMAL EFFICIENCY (AT RATED OUTPUT AND POWER GENERATING END) | 47.0% |

TCDF: TANDEM COMPOUND DOUBLE FLOW EXHAUST,
HP: HIGH PRESSURE PORTION,
IP: MIDDLE PRESSURE PORTION,
LP: LOW PRESSURE PORTION,
R/H: REHEATER (BOILER)

Figure 12:
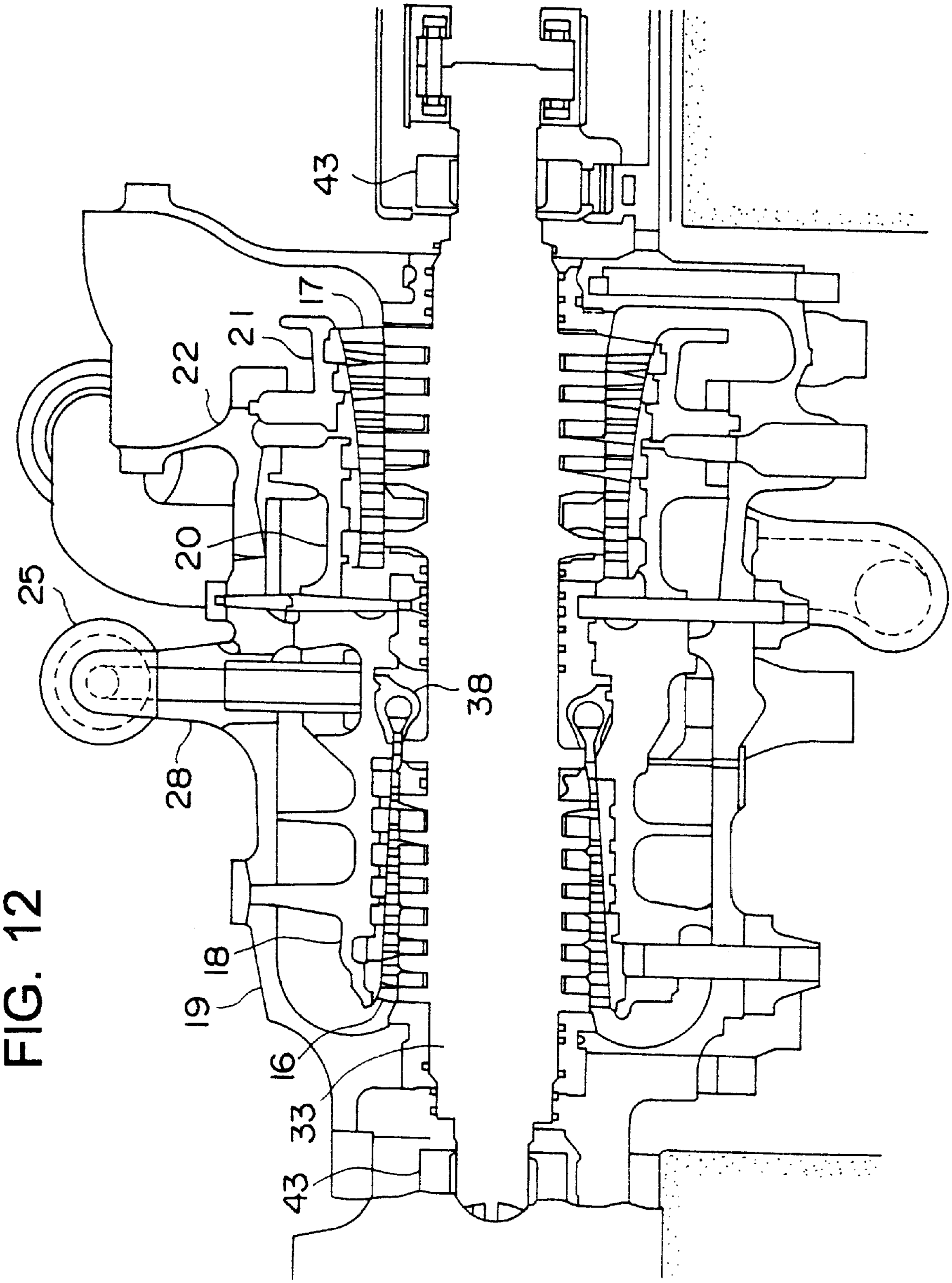
FIG. 12 is a cross sectional view of a high and intermediate pressure turbine.

FIG. 12 is a schematic view of a cross sectional structure of the high pressure and intermediate pressure integral type steam turbine. The high pressure steam turbine is provided with a high pressure axle (a high pressure rotor shaft) 33 mounting a high pressure rotor blade 16 within a high pressure internal chamber 18 and a high pressure external chamber 19 disposed outside the internal chamber 18. The high temperature and high pressure steam mentioned above can be obtained by the boiler mentioned above, is fed to a main steam inlet 28 from a flange and an elbow 25 constituting the ma n steam inlet through the main steam pipe and guided to the rotor blade at the first stage dual current from a nozzle box 38. The structure is made such that the steam enters from the center side of the rotor shaft and flows to the bearing side. The rotor blades are provided at eight stages in the high pressure side corresponding to a left side in the drawing and at six stages in the intermediate pressure side (corresponding to about right half in the drawing). The stator blades are provided in correspondence to each of the rotor blades. The rotor blade is structured in a saddle type, a clogs type, or a dovetail type, a double tenon, about 40 mm of the first stage blade length in the high pressure side and 100 mm of the first stage blade length in the low pressure side. A length between the bearings is about 6.7 m, a diameter of the smallest portion among the portion corresponding to the stator blade portion is about 740 mm, and a ratio of the length with respect to the diameter is about 9.0.

A width of the rotor blade mounting root portion of the first stage and the final stage in the high pressure side rotor shaft is greatest at the first stage, smaller than it, that is, 0.40 to 0.56 times the first stage and constant size at the second to seventh stages, and in a level in the middle of the first stage and the second to seventh stages, that is, 0.46 to 0.62 times the first stage at the final stage.

In the high pressure side, the blade and the nozzle are made of 12% Cr steel shown in Table 7 mentioned above. A length of the blade portion of the rotor blade in accordance with the present embodiment is set to 35 to 50 mm at the first stage, becomes longer in each of the stages from the second stage to the final stage, in particular, the length from the second stage to the final stage is within a range between 50 and 150 mm in accordance with the output of the steam turbine, the number of the stages is within a range between seven and twelve stages, the length of the blade portion at each of the stages is increased within a range between 1.05 and 1.35 times in the adjacent length in the downstream side with respect to the upstream side, and the rate is gradually increased in the downstream side.

The intermediate pressure side steam turbine is structured such as to rotate the power generating machine together with the high pressure steam turbine by the steam obtained by again heating the steam discharged from the high pressure steam turbine to a temperature of 566° C. by using the reheater, and is rotated at a rotational speed of 3600 times per minute. The intermediate pressure side turbine has an intermediate pressure internal second chamber 21 and an intermediate pressure external chamber 22 in the same manner as the high pressure turbine, and a stator blade is provided in opposite to the intermediate pressure rotor blade 17. The intermediate pressure rotor blade 17 is structured at six stages. The first stage blade length is about 130 mm, and the final stage blade length is about 260 mm. The dovetails are formed in an inverted Christmas tree type.

The rotor shaft of the intermediate pressure steam turbine is structured such that a width in an axial direction of the rotor blade mounting root portion is set such that the first stage is the greatest, the second stage is smaller than it, the third to fifth stages are smaller than the second stage and equal to each other, and the width of the final stage is in the middle of the third to fifth stages and the second stage and 0.48 to 0.64 times the first stage. The first stage is 1.1 to 1.5 times the second stage.

In the intermediate pressure side, the 12% Cr-base steel shown in Table 7 mentioned above is used for the blade and nozzle. The length of the blade portion of the rotor blade in accordance with the present embodiment is increased at each of the stages from the first stage to the final stage, the length from the first stage to the final stage is 90 to 350 mm in accordance with the output of the steam turbine, and within a range between the six to nine stages, the length of the blade portion of each of the stages is increased at a rate of 1.10 to 1.25 between the adjacent lengths in the downstream side with respect to the upstream side.

The mounting portion of the rotor blade is structured such that the diameter thereof is larger than that of the portion corresponding to the stator blade, and the width thereof depends on the length of the blade portion of the rotor blade and the position thereof. The rate of the width thereof with respect to the length of the blade portion of the rotor blade is the greatest at the first stage, that is, 1.35 to 1.8, 0.88 to 1.18 at the second stage, and is reduced from the third stage to the sixth stage, that is, 0.40 to 0.65 times.

The high and intermediate pressure integral turbine for the steam turbine power generating plant provided with two low pressure turbines connected in a tandem manner in accordance with the present embodiment is structured such that the distance between the bearings is about 5.7 m.

Also in the present embodiment, in the same manner as that of the embodiment 3, a build up welded layer made of a low alloy steel is provided in the bearing portion.

Figure 13:
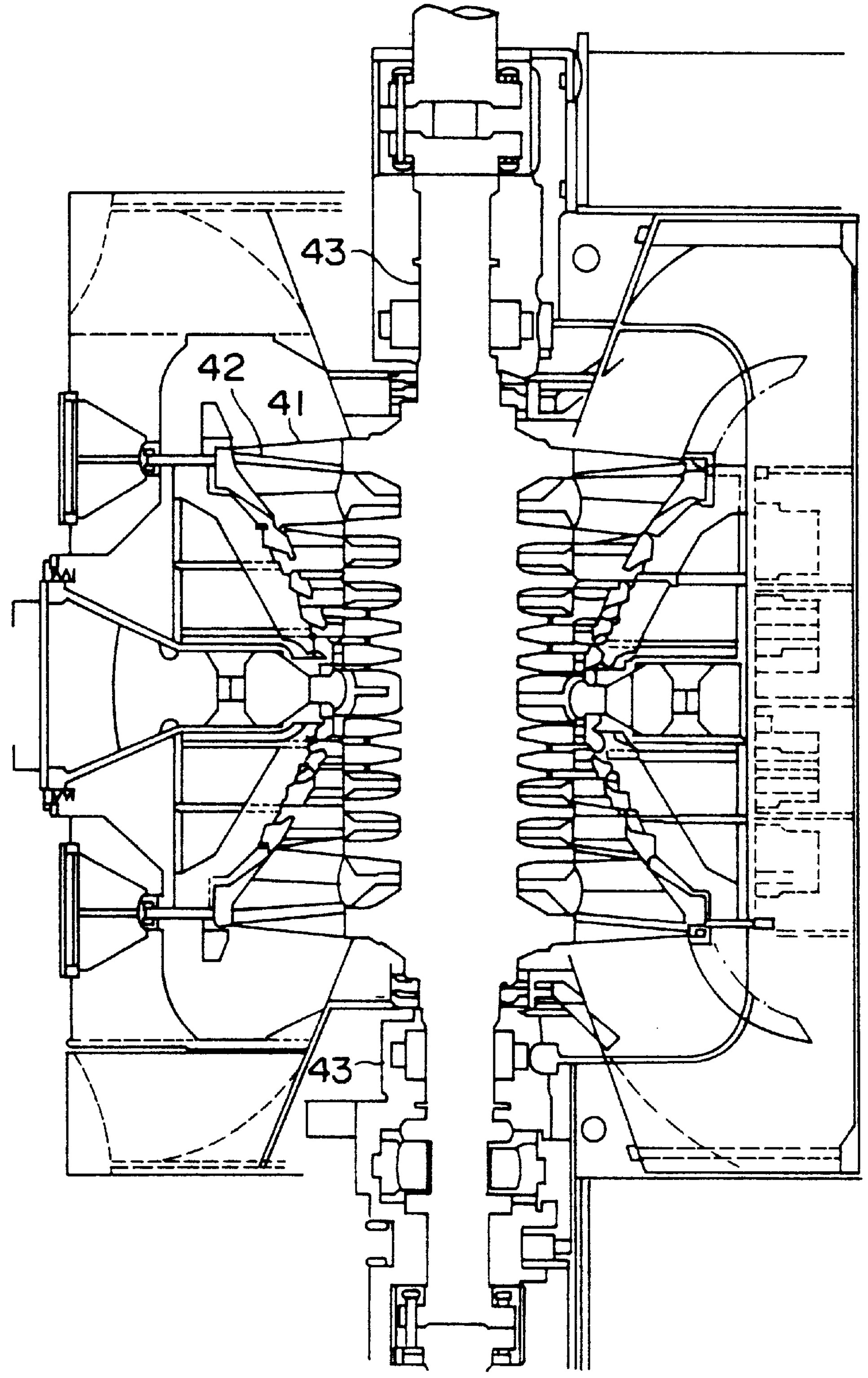
FIG. 13 is a cross sectional view of a low pressure steam turbine.
Figure 14:
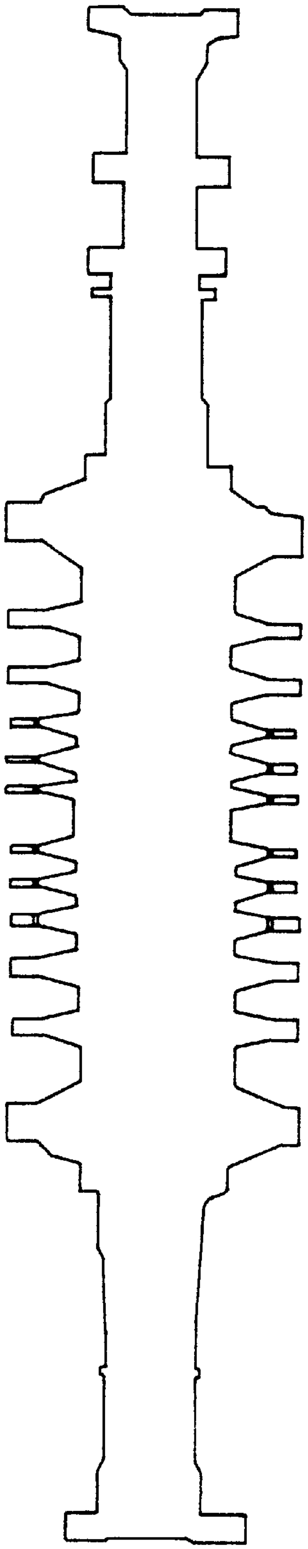
FIG. 14 is a cross sectional view of a rotor shaft for a low pressure steam turbine.

FIG. 13 is a cross sectional view of a low pressure turbine with 3600 rpm and FIG. 14 is a cross. sectional view of a rotor shaft thereof.

The low pressure turbine is constituted by one turbine and is connected to a high and intermediate pressure at 538° C./566° C. of the main steam in a tandem manner. The rotor blades 41 are arranged at six stages in right and left lines substantially in a symmetrical manner, and the stator blades 42 are provided in correspondence to the rotor blades. A length of the rotor blade at the final stage is 46 inches, and the Ti-base alloy is employed. As the Ti-base alloy, the materials shown in the embodiments 1 and 2 are employed. In particular, the material containing 6 weight % of Al, 6 weight % of V and 2 weight % of Sn is preferably used. Further, the same material as that of the embodiment 2 is employed for the rotor shaft 43, that is, a forged steel having a fully tempered bainite structure of a super clean material comprising 3.75% of Ni, 1.75% of Cr, 0.4% of Mo, 0.15% of V, 0.25% of C, 0.05% of Si, 0.10% of Mn and the remaining Fe is employed. A 12% Cr steel containing 0.1% of Mo is used for the rotor blades and the stator blades at the stages other than the final stage and the preceding stage. A cast steel containing 0.25% of C is used for the internal and external casing materials. A distance between the centers in the bearing 43 in accordance with the present embodiment is 7000 mm, a diameter of the rotor shaft corresponding to the stator blade portion is about 800 mm, and a diameter at the rotor blade mounting portion is constant at all of the stages. A distance between the centers of the bearings with respect to the diameter of the rotor shalt corresponding to the stator blade portion is about 8.8.

The low pressure turbine is structured such that the width in the axial direction of the rotor blade mounting root portion is the smallest at the first stage, is gradually increased toward the downward side at four steps, that is, that at the second and third stages is the same, that at the fourth and fifth stages is the same and the width at the final stage is 6.2 to 7.0 times larger than the width at the first stage. The width at the second and third stages is 1.15 to 1.40 times larger than that at the first stage, that at the fourth and fifth stages is 2.2 to 2.6 times larger than that at the second and third stages, and that at the final stage is 2.8 to 3.2 times larger than that at the fourth and fifth stages. The width of the root portion is expressed by points connecting an expanding line and the diameter of the rotor shaft.

The length of the blade portion of the rotor blade in accordance with the present embodiment is greater from 4 inches at the first stage to 46 inches at the final stage at each of the stages, and the length from the first stage to the final stage is increased within the range between 100 and 1270 mm due to the output of the steam turbine, in eight steps at the maximum, and the length of the blade portion at each of the stages is increased within the range between 1.2 to 1.9 times so that the length at the downstream side is longer than that at the adjacent upstream side.

The mounting root portion of the rotor blade is structured such that the diameter thereof is greater than that of the portion corresponding to the stator blade in an expanding manner, and the mounting width thereof is increased in accordance with an increase of the length of the blade portion. The rate of the width with respect to the length of the blade portion is 0.30 to 1.50 from the first stage to the stages prior to the final stage, the rate is gradually reduced from the first stage to the stage prior to the final stage, and the rate at the back stage is gradually reduced within the range of 0.15 to 0.40 in comparison with that at the preceding stage. The rate at the final stage is 0.50 to 0.65.

The erosion shield in the present embodiment is provided in the same manner as that of the embodiment 2.

In addition to the present embodiment, the same structure can be applied to a 1000 MW class great capacity power generating plant in which the steam inlet temperature of the high and intermediate pressure steam turbine is set to 610° C. or more, the steam inlet temperature to the low pressure steam turbine is set to about 400° C. and the outlet temperature thereof is set to about 60° C.

The high temperature and high pressure steam turbine power generating plant in accordance with the present embodiment is mainly constituted by a boiler, a high and intermediate pressure turbine, a low pressure turbine, a condenser, a condensing pump, a low pressure water supply heater system, a deaerator, a pressure increasing pump, a water supply pump, a high pressure water supply heater system and the like. That is, a ultra high temperature and high pressure steam generated in the boiler enters into the high pressure turbine so as to generate a power, and thereafter is again reheated by the boiler and enters into the intermediate pressure side turbine so as to generate the power. The high and intermediate pressure turbine discharged steam is condensed in the condenser after entering into the low pressure turbine so as to generate the power. The condensed fluid is fed to the low pressure water supply heater system and the deaerator by the condensing pump. The supplied water deaerated in the deaerator is fed to the high pressure water supply heater by the water supply pump and heated, and thereafter returned to the boiler.

Here, in the boiler, the supplied water becomes a steam having a high temperature and a high pressure with passing through a fuel economizer, an evaporator and a super heater. Further, on the contrary, the boiler combustion gas heating the steam comes out from the fuel economizer, and thereafter enters into an air heater so as to heat the air. In this case, a water supply pump driving turbine driven by an extracted steam from the intermediate pressure turbine is employed for driving the water supply pump.

In the high temperature and high pressure steam turbine plant structured in the manner mentioned above, since the temperature of the supplied water coming out from the high pressure water supply heater system becomes significantly higher than the temperature of the supplied water in the conventional thermal electric power plant, the temperature of the combustion gas coming out from the fuel economizer within the boiler necessarily higher than that of the conventional boiler in a significant level. Accordingly, it is intended to recover a heat from the boiler discharged gas so as to prevent the gas temperature from lowering.

Here, the present embodiment is structured such that the high and intermediate pressure turbine and one low pressure turbine are connected to one power generator in a tandem manner so as to generate an electric power, thereby obtaining a tandem compound double flow type power generating plant. The same structure as that of the present embodiment can be applied to the other embodiment in which two low pressure turbines are connected in a tandem manner so as to generate an electric power at an output of 1050 MW class. A stronger structure is employed for a shaft of the power generator. In particular, a material having a fully tempered bainite structure containing 0.15 to 0.30% of C, 0.1 to 0.3% of Si, 0.5% or less of Mn, 3.25 to 4.5% of Ni, 2.05 to 3.0% of Cr, 0.25 to 0.60% of Mo and 0.5 to 0.20% of V, having a tensile strength at room temperature of 93 $kgf/mm^2$ or more, particularly 100 $kgf/mm^2$ or more, and having a 50% FATT of 0° C. or less, particularly −20° C. or less is preferable, and further a material having a magnetization force at 21.2 KG of 985 AT/cm or less, a total amount of F, S, Sn, Sb and As as impurity of 0.025% or less and a Ni/Cr ratio of 2.0 or less is preferable.

Table 7 mentioned above can be applied to the main portion of the high and intermediate pressure turbine and the low pressure turbine in accordance with the present embodiment. In accordance with the present embodiment, since all the portion is made of the material having a ferrite crystal structure and a coefficient of thermal expansion of about 12×10−6/° C. by using a martensite steel around the other rotating portion of the high and intermediate pressure integral rotor shaft obtained by integrally forming the high pressure side with the intermediate pressure side, there is no problem caused by a difference of a coefficient of thermal expansion.

Further, the material of the embodiment 2 can be used for the rotor shaft of the high pressure, the intermediate pressure or the high and intermediate pressure turbine in the case of the steam temperature of 620° C. or more. In accordance with the present embodiment, the turbine is formed by dissolving 30 tons of a heat resisting cast steel described in Table 7 (weight %) in an electric furnace, vacuum deoxidizing a carbon, casting to a metal casting mold, forging so as to manufacture an electrode rod, again dissolving an electronic slug so as to dissolve the electrode rod from an upper portion of the cast steel to a lower portion thereof, and forging in a rotor shape (diameter 1450 mm and length 5000 mm). The forging is performed at a temperature equal to or less than 1150° C. in order to prevent a forging crack. Further, it is obtained by annealing the forged steel, thereafter heating to 1050° C., hardening by spraying a water, tempering at 570° C. and 690° C. for two times and cutting to a predetermined shape. Further, a build up weld layer made of Cr—Mo low alloy steel is applied to the bearing portion.

The low pressure turbine for the steam turbine power generating plant provided with two low pressure turbines connected in a tandem manner in accordance with the present embodiment is structured such that a total distance between the bearings is 13.9 m, a ratio of the distance between the bearings of two low pressure turbines connected in a tandem manner with respect to the length of the blade portion of the rotor blade at the final stage in the low pressure turbine is 16.3, and a ratio of a total distance (mm) of the distances between the bearings of two low pressure turbines connected in a tandem manner with respect to the rated output (MW) of the power generating plant is 23.1.

The low pressure turbine for the steam turbine power generating plant provided with the high and intermediate pressure integral turbine obtained by integrally forming the high pressure turbine with the intermediate pressure turbine and one low pressure turbine in accordance with the present embodiment is structured such that a distance between the bearings is about 6 m, a ratio with respect to the length of the blade portion of the rotor blade at the final stage in the low pressure turbine is 5.5, and a ratio of a distance (mm) between the bearings of one low pressure turbine with respect to the rated output (MW) of the power generating plant is 10.0.

The high pressure, the intermediate pressure and the high and intermediate pressure integral type rotor shaft in accordance with the present embodiment have the center hole in all of the rotor shafts, however, it is possible to cancel the center hole in all of the embodiments due to a high purification by particularly setting an amount of P to 0.010% or less, an amount of S to 0.005% or less, an amount of As to 0.005% or less, an amount of Sn to 0.005% or less, and an amount of Sb to 0.003% or less.

The power generating plant in accordance with the present invention can be applied to a condition of 3000 rpm, and can be applied to the blade length at the final stage of 52 inches or 56 inches.

In accordance with the present invention, a target tensile strength 110 kg/mm$^2$ can be secures in a large-scale forged product which is greatly influenced by a mass effect as a Ti-base alloy for the rotor blade at the final stage of the low pressure steam turbine, and the steam turbine long blade can be applied such that the blade of 43 inches or more can be applied to a condition of 3600 rpm and the blade of 50 inches or more can be applied to a condition of 3000 rpm, so that it is possible to increase a capacity of the steam turbine power generating plant having the steam temperature of 538 to 660° C. and a higher efficiency can be achieved.

What is claimed is:

1. A method of manufacturing a steam turbine blade made of Ti-base alloy and having a blade portion and dovetails, including after hot forging said blade material, performing a solid solution treatment including heating followed by cooling and then an age treatment including heating followed by cooling, wherein a temperature for the heating in the solid solution treatment is in a range of 790° C. to 855° C. while a temperature for the heating in the age treatment is in a range of 410° C. to 590° C.

2. A method of manufacturing a steam turbine blade made of Ti-base alloy and having a blade portion and dovetails, wherein an area expressed by an age temperature and a solid solution treatment temperature is structured by performing a solid solution treatment including heating followed by cooling and then an age treatment including heating followed by cooling, wherein a temperature for the heating in the solid solution treatment is in a range of 790° C. to 855° C. while a temperature for the heating in the age treatment is in a range of 410° C. to 510° C.

3. A method of manufacturing a steam turbine blade made of Ti-base alloy and having a blade portion and dovetails, wherein said dovetail portion is roughly processed to a state close to a final shape prior to a final heat treatment, said final heat treatment including a solid solution treatment including heating followed by cooling and an age treatment including heating followed by cooling, wherein a temperature for the heating in the solid solution treatment is in a range of 790° C. to 855° C. while a temperature for the heating in the age treatment is in a range of 410° C. to 585° C.

4. A method of manufacturing a steam turbine blade made of Ti-base alloy and having a blade portion and dovetails, wherein said dovetail portion is roughly processed to a state close to a final shape prior to a final heat treatment, said final heat treatment including a solid solution treatment including heating followed by cooling and an age treatment including heating followed by cooling, wherein a temperature for the solid solution treatment is in a range of 790° C. to 855° C. while a temperature for the age treatment is in a range of 410° C. to 560° C.

5. A method of manufacturing a steam turbine blade as claimed in claim 1, wherein said Ti-base alloy is constituted by a Ti-base alloy containing 4 to 8 weight % of Al, 4 to 8 weight % of V and 1 to 4 weight % of Sn.

6. A method of manufacturing a steam turbine blade as claimed in claim 2, wherein said Ti-base alloy is constituted by a Ti-base alloy containing 4 to 8 weight % of Al, 4 to 8 weight % of V and 1 to 4 weight % of Sn.

7. A method of manufacturing a steam turbine blade as claimed in claim 3, wherein said Ti-base alloy is constituted by a Ti-base alloy containing 4 to 8 weight % of Al, 4 to 8 weight % of V and 1 to 4 weight % of Sn.

8. A method of manufacturing a steam turbine blade as claimed in claim 4, wherein said Ti-base alloy is constituted by a Ti-base alloy containing 4 to 8 weight % of Al, 4 to 8 weight % of V and 1 to 4 weight % of Sn.

9. A method of manufacturing a steam turbine blade as claimed in claim 1, wherein said solid solution treatment includes cooling by water after said heating.

10. A method of manufacturing a steam turbine blade as claimed in claim 2, wherein said solid solution treatment includes cooling by water after said heating.

11. A method of manufacturing a steam turbine blade as claimed in claim 3, wherein said solid solution treatment includes cooling by water after said heating.

12. A method of manufacturing a steam turbine blade as claimed in claim 4, wherein said solid solution treatment includes cooling by water after said heating.

13. A method of manufacturing a steam turbine blade as claimed in claim 1, wherein said solid solution treatment includes cooling by air impact after said heating.

14. A method of manufacturing a steam turbine blade as claimed in claim 2, wherein said solid solution treatment includes,cooling by air impact after said heating.

15. A method of manufacturing a steam turbine blade as claimed in claim 3, wherein said solid solution treatment includes cooling by air impact after said heating.

16. A method of manufacturing a steam turbine blade as claimed in claim 4, wherein said solid solution treatment includes cooling by air impact after said heating.

* * * * *